US012567701B2

(12) United States Patent
Houvenaghel et al.

(10) Patent No.: US 12,567,701 B2
(45) Date of Patent: Mar. 3, 2026

(54) CONNECTOR

(71) Applicant: Connecteurs Electriques Deutsch, Evreux (FR)

(72) Inventors: Fabien Houvenaghel, Evreux (FR); Christian Cavailles, Evreux (FR)

(73) Assignee: Connecteurs Electriques Deutsch, Evreux (FR)

( * ) Notice: Subject to any disclaimer, the term of this patent is extended or adjusted under 35 U.S.C. 154(b) by 462 days.

(21) Appl. No.: 18/167,126

(22) Filed: Feb. 10, 2023

(65) Prior Publication Data

US 2023/0253731 A1 Aug. 10, 2023

(30) Foreign Application Priority Data

Feb. 10, 2022 (EP) .................................... 22305152

(51) Int. Cl.

*H01R 13/627* (2006.01)
*H01R 13/633* (2006.01)
*H01R 13/639* (2006.01)
*H01R 13/64* (2006.01)

(52) U.S. Cl.

CPC ....... *H01R 13/6276* (2013.01); *H01R 13/633* (2013.01); *H01R 13/639* (2013.01); *H01R 13/64* (2013.01)

(58) Field of Classification Search

CPC .................................................. H01R 13/6276

See application file for complete search history.

(56) References Cited

U.S. PATENT DOCUMENTS

| | | | |
|---|---|---|---|
| 4,938,710 | A | 7/1990 | Aihara et al. |
| 5,114,361 | A | 5/1992 | Houtteman |
| 6,878,001 | B2 | 4/2005 | Nishide |
| 2011/0151694 | A1 | 6/2011 | Horiuchi et al. |
| 2020/0136309 | A1 | 4/2020 | Grandcoing |

(Continued)

FOREIGN PATENT DOCUMENTS

| | | | |
|---|---|---|---|
| DE | 102017127991 | A1 | 5/2019 |
| EP | 0033286 | A3 | 1/1981 |

(Continued)

OTHER PUBLICATIONS

Extended European Search Report, Application No. 22305152.5-1201, Dated: Jul. 19, 2022, 10 pages.

*Primary Examiner* — Neil Abrams
(74) *Attorney, Agent, or Firm* — Barley Snyder

(57) ABSTRACT

A connector matable along a mating axis with a mating connector includes an inner housing element having a receptacle, an outer housing element movable along the mating axis to the inner housing element from an unmated position of the outer housing element to a mated position of the outer housing element, and a coupling element with a hollow receiving and coupling with a plug of the mating connector. The coupling element is arranged inside the receptacle of the inner housing element and is movable along the mating axis from an unmated position of the coupling element to a mated position of the coupling element. The coupling element is connected to the outer housing element by a motion-reversing mechanical system and movement of the outer housing element in one direction along the mating axis moves the coupling element in an opposite direction relative to the inner housing element.

20 Claims, 19 Drawing Sheets

(56) References Cited

U.S. PATENT DOCUMENTS

| | | | | |
|---|---|---|---|---|
| 2020/0343670 | A1 | 10/2020 | Hammerling | |
| 2023/0253731 | A1 * | 8/2023 | Houvenaghel | H01R 13/639 439/304 |
| 2023/0253732 | A1 * | 8/2023 | Houvenaghel | H01R 13/6453 439/350 |

FOREIGN PATENT DOCUMENTS

| | | | |
|---|---|---|---|
| EP | 0033286 | A2 | 8/1981 |
| EP | 3819998 | A1 | 11/2019 |
| FR | 3064120 | A1 | 9/2018 |
| GB | 2987072 | A | 6/1972 |

* cited by examiner

CONNECTOR

CROSS-REFERENCE TO RELATED APPLICATIONS

This application claims the benefit of the filing date under 35 U.S.C. § 119(a)-(d) of European Patent Application No. 22305152.5, filed on Feb. 10, 2022.

FIELD OF THE INVENTION

The present invention relates to a connector configured to receive a plug of a mating second connector. The present invention further relates to a coding clip for a fool proofing the mating of a connector with a mating second connector.

BACKGROUND

Connectors are known in the art that are configured to be mated along a mating axis with mating connectors. In particular, electrical connectors are known that can be equipped with electrical terminals coupled with electrical conductors, and which close an electrical circuit when a connector is correctly mated along a mating axis with a mating connector such that the respective electrical terminals of the connectors are engaged.

In many industrial applications, for example aeronautical or military applications, mated connectors can be subjected to important levels of vibrations and mechanical stress, which may degrade individual electrical contacts as well as the overall mating connection of connectors. In order to improve the reliability of the electrical connection, a robust mating of connectors in a mated position is necessary.

Conventionally, coupling screw solutions have been implemented to ensure a robust and secure mating of connectors and lock mated connectors in the mated position. Consequently, screw-less solutions have been presented in the prior art. European patent application EP 19 306 460.7 for example discloses an electrical connector assembly that has dispensed with the need for coupling screws by virtue of a lever mechanism. Application EP 19 306 460.7 describes a first connector comprising a manual lever, whose load end is configured to engage with a J-shaped opening in a central plug of a second connector to be mated with the first connector. This connector thus provides a mating of two connectors by supplanting conventional screw-on mating with a mating in locking in three movements: initial assembly of two connectors wherein the central plug of the second connector is inserted, actuation of the lever, and actuation of a locking device for the lever.

Further, in some typical applications, the coupling screws or other coupling parts of the connectors have been provided with fool proofing mechanisms, in particular molded coding shapes that block the assembly and mating of connectors in the case of an unintended wrong or unintended assembly of connectors. By providing respective male and female coding shapes on respective parts of male and female connectors that are configured to engage during the mating of the connectors, the risk of a mechanically or electrically unintended mating is reduced.

In many industrial applications, connectors may often need to be exchanged, verified, serviced, or re-arranged for new applications. This is in particular the case for modular electrical connectors, meaning connectors that can selectively be equipped with electrical contacts. The time needed for the assembling and mating of two unmated connectors, as well as the disassembling and unmating of two mated connectors, can often be excessively long. For example, a lever solution such as described in EP 19 306 460.7 requires at least three distinct movements for the mating of connectors, namely first an initial mounting movement, second a lever actuation movement that moves the connectors from an unmated to a mated position, and a third a locking movement that actuates a locking mechanism.

Conventional fool proofing devices, which foresee the molding of corresponding coding shapes on parts of the connectors, increase the production and logistical costs for managing the manufacture, storage and assembly of coded connectors and coding elements.

SUMMARY

A connector matable along a mating axis with a mating connector includes an inner housing element having a receptacle, an outer housing element movable along the mating axis to the inner housing element from an unmated position of the outer housing element to a mated position of the outer housing element, and a coupling element with a hollow receiving and coupling with a plug of the mating connector. The coupling element is arranged inside the receptacle of the inner housing element and is movable along the mating axis from an unmated position of the coupling element to a mated position of the coupling element. The coupling element is connected to the outer housing element by a motion-reversing mechanical system and movement of the outer housing element in one direction along the mating axis moves the coupling element in an opposite direction relative to the inner housing element.

BRIEF DESCRIPTION OF THE DRAWINGS

Exemplary embodiments of the invention are described by way of the following drawings. In the drawings.

DETAILED DESCRIPTION OF THE EMBODIMENT(S)

Figure 1A:
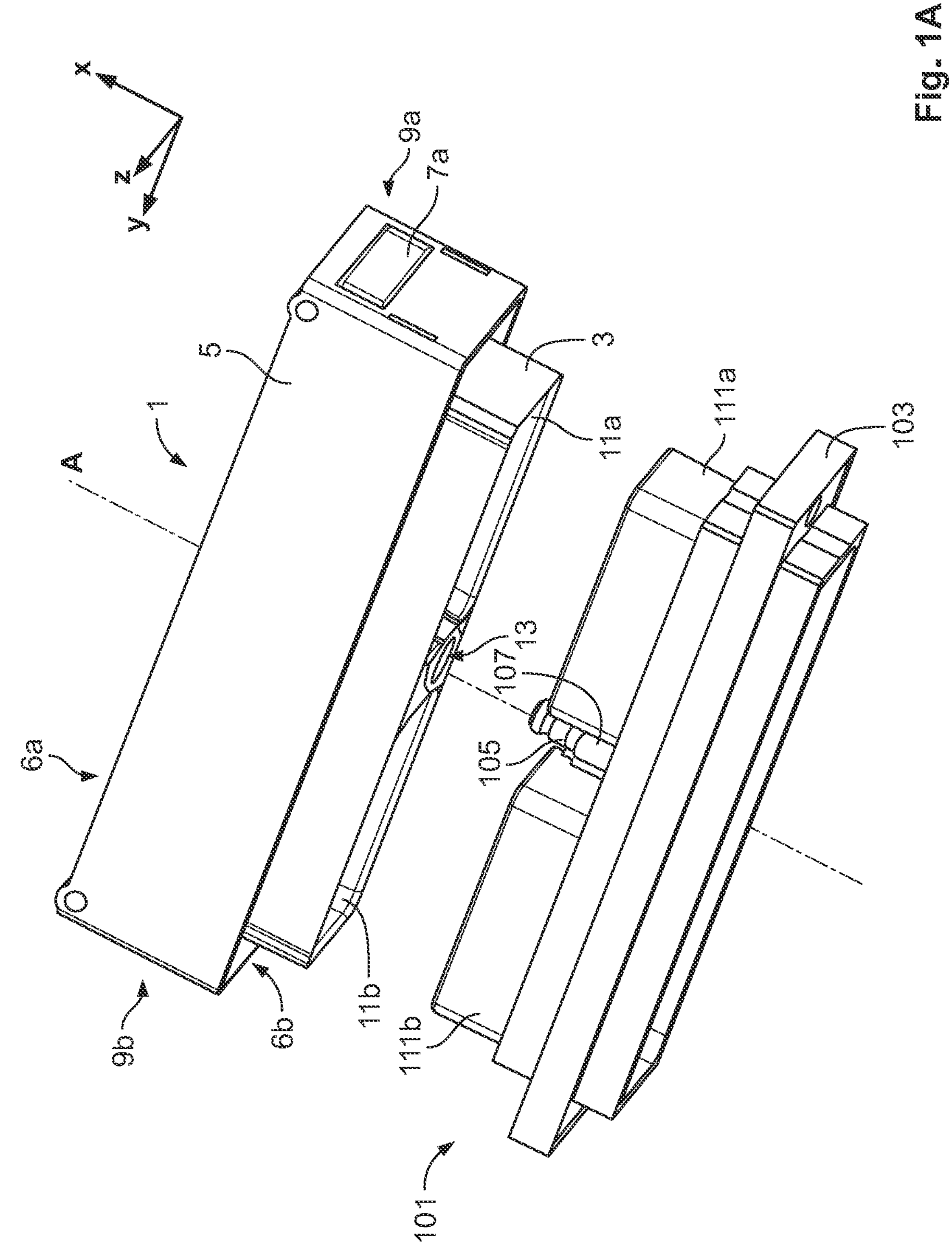
FIG. 1A displays a connector according to a first embodiment of the invention, and a second connector, in an unassembled position.

The connector addressing the first object of the invention is described in the first, third, fourth and fifth embodiment of the invention described hereunder. The second embodiment of the invention relates to a coding clip for the fool-proofing of the mating of the connector with a second connector addressing the second object of the invention. The features of the various embodiments can be combined with each other and/or individual features of one embodiment can be realized together with one or more of the other embodiments. In particular the embodiments addressing the first object of the invention can be combined with the second embodiment addressing the second object of the invention.

In the following descriptive part, identical reference numerals in the text and in the figures refer to identical elements, of which the repeated descriptions will be avoided as a matter of convenience.

A connector according to a first embodiment of the invention will be described with reference to FIGS. 1A to 4B. The successive figures will in particular seek to illustrate the advantageous mating sequence of the invention.

FIG. 1A displays a connector 1, comprising an inner housing element 3 and an outer housing element 5. The outer housing element 5 envelopes the inner housing element 3 in the manner of a sheath, or an encasement, wherein the inner housing element has one degree of freedom of movement along the mating axis A, parallel to the mating direction x.

The outer housing element 5 and the inner housing element 3 both have substantially rectangular concentric cross-sections across the y-z plane, wherein the circumference of the outer housing element 5 surrounds the cross-section of the inner housing element 3. However, according to variants, the outer housing element 5 and the inner housing element could also have other shapes.

The outer housing element 5 ensheaths, or envelops the inner housing element 3, leaving openings 6*a*, 6*b* in the directions of the mating axis A, thereby allowing a convenient manual grip and manipulation of the outer housing element 5 by a user.

In this embodiment, the inner housing element 3 can made of stainless steel, an aluminum alloy, or a composite material. The outer housing element 5 can be made of a plastic, e.g. a hard polymer material, in particular a polyetherimide, more in particular ULTEM®, that has durability and resistance to external mechanical or environmental stresses and can be realized with a rough surface, for more convenient gripping. In an alternative, the outer housing can be made of metal. Alternatively, the outer housing element 5 can be made of the same material as the inner housing element 3.

A locker element 7*a* is arranged moveably in a direction perpendicular to the mating axis A on one short lateral side 9*a* of the outer housing element 5. An identical locking element 7*b*, not visible on FIG. 1A, is symmetrically arranged with respect to the mating axis A on the other short lateral side 9*b*. The purpose and function of the locking elements 7*a*, 7*b* will be explained with reference to FIGS. 4A and 4B.

The inner housing element 3 comprises two female compartments 11*a*, 11*b* arranged symmetrically with respect to the mating axis A, while a receptacle inlet 13 is located centrally, in between the two female compartments 11*a*, 11*b*. The receptacle inlet 13 represents the inlet to the space of a receptacle 15, not visible on FIG. 1A but visible on FIG. 1*b*, which extends along the mating axis A through the inner housing element 3. According to alternative realizations of the invention, the inner housing element 3 may comprise more or less compartments. The compartments can also be of a male type. FIG. 1A further illustrates a mating second connector 101, comprising a main housing element 103 and a central plug 105, having an elongated shape extending along the mating axis A in mating direction x. The central plug 105 is configured to be inserted in the receptacle 15 via the receptacle inlet 13 of the connector 1. The two connectors 1, 101 are not yet connected.

The central plug 103 is equipped with a coding clip 107 whose purpose and function will be explained with reference to FIG. 2A. The coding clip 107 represents a second aspect of the present invention, as explained further down with respect to the second embodiment of the invention.

The second connector 101 further comprises mating male compartments 111*a*, 111*b*, which are symmetrically arranged on each side of the mating axis A and the central plug 105, and are configured to be inserted in the respective female compartments 11*a*, 11*b* of the connector 1. As for the connector 1, the second connector 101 can have more or less compartments depending on the number of compartments of the connector 1. They can be of a female type as well, depending of the type used for the connector 1.

Figure 1B:
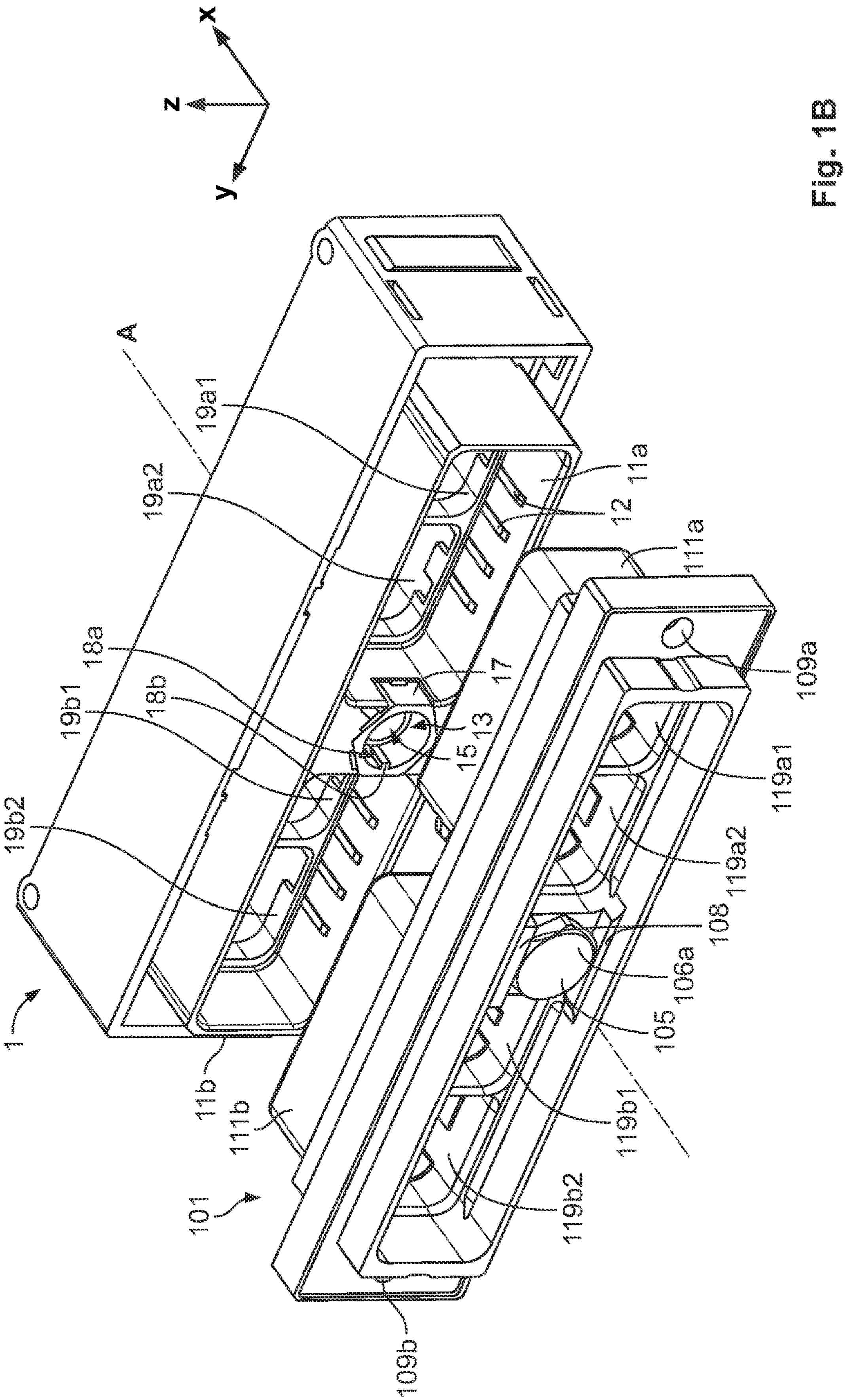
FIG. 1B displays the connectors of FIG. 1A from a different angle.

FIG. 1B shows the connectors 1 and 101 of from a second, oblique view. FIG. 1B shows that the female compartments 11*a*, 11*b* of connector 1 comprise each two sub-compartments 19*a*1, 19*a*2, 19*b*1, 19*b*2. Respectively, male compartments 111*a*, 111*b*, of the second connector 101 comprise sub-compartments 119*a*1, 119*a*2, 119*b*1, 119*b*2.

The view of FIG. 1B also illustrates that the receptacle inlet 13 is equipped with a coding ring 17 comprising a coding shape 19. The coding ring 17 thus represents an opening into the receptacle 15, which extends along the mating axis A through the inner housing element 3. The coding ring is fitted into the inner housing 3 such that it cannot rotate around its axis.

The coding ring 17 in this embodiment comprises two coding shapes, a primary coding protrusion 18*a* and a secondary coding protrusion 18*b*. The primary protrusion 18*a* and the secondary protrusion 18*b* are aligned with corresponding shapes in the coding clip 107. The coding ring 17 together with a mating coding clip 107 allow for a foolproof connection between two connectors. The sub-compartments 19*a*1, 19*a*2, 19*b*1, 19*b*2 and 119*a*1, 119*a*2, 119*b*1, 119*b*2 can for example be equipped with electrical modules comprising electrical contacts. For example, sub-compartment 19*a*2 can comprise an electrical module of female contacts, and sub-compartment 119*a*2 can comprise an electrical module of male contacts, while sub-compartments 19*a*1, 19*b*1, 19*b*2, 119*a*1, 119*b*1, 119*b*2 remain empty.

The central plug 105 is inserted in mating direction x in a corresponding central opening (not visible) in the second connector 101. The enlarged head 106*a* of the central plug 105 has a hexagonal shape and abuts against the backside of the second connector 101. The enlarged head 106*a* of the central plug 105 is furthermore positioned in a depression 108 formed by two parallel walls. The two walls prevent a rotation of plug 105 around its axis.

FIG. 1B also shows that the connector 101 is provided with fixing holes 109*a*, 109*b*. The fixing holes 109*a*, 109*b* can be used to mount the connector 101, for example on a platine chassis on which a multitude of connectors 101 are mounted side-by-side laterally along the y axis or transversally along the z axis, i.e. one on top of the other.

The female compartments 11*a*, 11*b* comprise thin rib protrusions 12, which provide electromagnetic shielding protecting against electromagnetic interference, by establishing an electrical connection with the respective male compartments 111*a*, 111*b*. To improve the EMI functionality, a nickel-coating can be provided.

In some embodiments, the connectors 1 and second connectors 101 are electrical, rectangular, modular connectors suitable for aerospace applications.

Figure 2A:
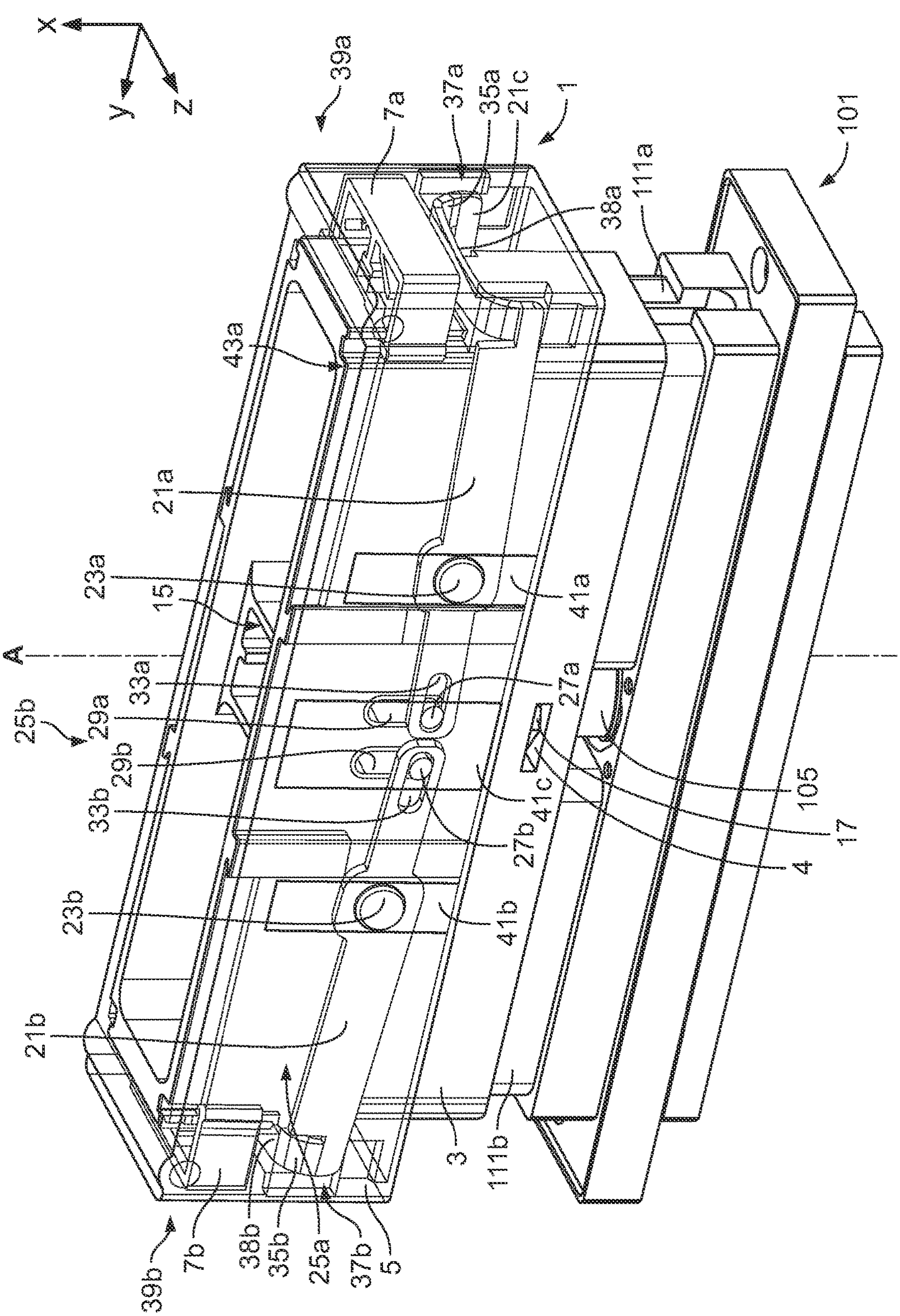
FIG. 2A displays the connector of the first embodiment with the second connector in an inserted position, wherein the outer housing element is rendered semi-transparent.

FIG. 2A illustrates the connector 1 and the second connector 101 in a next stage of the mating, wherein an initial insertion has been enacted, called henceforth "inserted position" in a semi-transparent view. In this position, the connector 1 and the second connector 101 have been converged such that the compartments 11*a*, 11*b* (not visible) of the connector 1 have received compartments 111*a*, 111*b* of the second connector 101. Similarly, not visible on FIG. 2A, the receptacle 15 has received the plug 105 through the coding ring 17 mounted at the inlet 13.

FIG. 2A shows two lever beams 21*a*, 21*b* that are pivotally mounted on two respective hinges 23*a*, 23*b* formed on a first side 25*a* of the inner housing element 3. The hinges 23*a*, 23*b* represent fixed fulcrum points for the lever beams 21*a*, 21*b* on the inner housing element 3.

On a second side 25*b* of the inner housing element 3, opposed to the first side 25*a* with respect to a direction z orthogonal to the mating direction x, but hidden on FIG. 2A, two further lever beams are mounted on respective hinges. The arrangement is substantially symmetric with respect to a direction y orthogonal to the mating direction x with the arrangement of lever beams 21*a*, 21*b* and hinges 23*a*, 23*b*. An extremity of lever beam 21*c*, arranged on side 25*b* symmetrically to lever beam 21*a*, is visible underneath locker element 7*a*.

At one end, the lever beams 21*a*, 21*b* are pivotally attached to cylindrical bolts, or pins, 27*a*, 27*b*. The pins 27*a*, 27*b* traverse the inner housing element 3 through traversing holes 29*a*, 29*b* formed in the inner housing element 3. The traversing holes 29*a*, 29*b* traverse the inner housing element 3 in the direction opposed to the direction z orthogonal to the mating direction x, and have an oblong cross-sectional area in the x-y plane, wherein the extension of the area in x direction is elongated compared to the extension of the area in y direction. Thus, the pins 27*a*, 27*b* have a freedom of movement in x direction inside the traversing holes 29*a*, 29*b*.

Figure 2B:
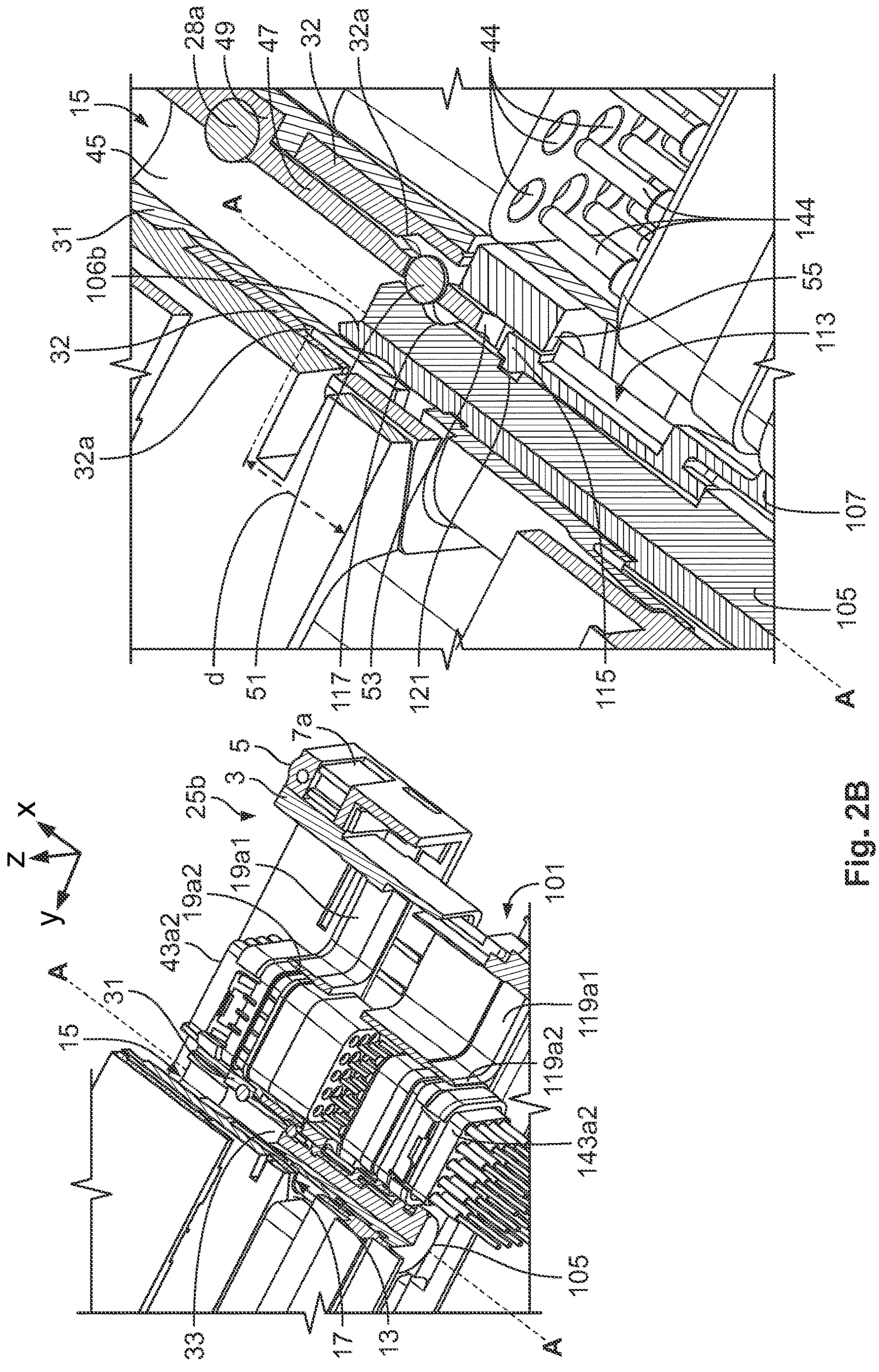
FIG. 2B displays the inserted position view of the connectors of FIG. 2A, wherein the connectors are partially sectioned, including a close-up view.

The pins 27*a*, 27*b* are both rigidly attached to a coupling element 31, which is not visible on FIG. 2A but visible in FIG. 2*b* and which is arranged inside the receptacle 15. Thus, the movement of pins 27*a*, 27*b* along the freedom of movement in x direction is identical.

Similarly, the cylindrical pins 27*a*, 27*b* are attached to the lever beams 21*a*, 21*b* through cam grooves 33*a*, 33*b* formed respectively in each lever beam 21*a*, 21*b*, such that the lever beams 21*a*, 21*b* can freely rotate around the hinges 23*a*, 23*b* in conjunction with the movement of the pins 27*a*, 27*b*.

At the other end, each lever beam 21*a*, 21*b*, is rigidly attached respective to a blade spring 35*a*, 35*b*. Similarly, on the second side 25*b* of the inner housing element 3, the lever beams are also rigidly attached respectively to the blade springs 35*a*, 35*b*. The blade spring 35*a* links lever beam 21*a* with the corresponding lever on side 25*b* 21*c* and forms a bridge-type connection that can transmit a displacement force. Symmetrically with respect to the mating axis A, the blade spring 35*b* links lever beam 21*b* with the corresponding lever on side 25*b* and forms a bridge-type connection that can transmit a displacement force.

The blade springs 35*a*, 35*b* are located inside respective blade spring spaces 37*a*, 37*b*, which are spaces that extend between the outer housing element 5 along the short sides 39*a*, 39*b* of the connector 1 and the inner housing element 3. The blades 38*a*, 38*b* of the blade springs 35*a*, 35*b* face in the mating direction x. The blade springs 35*a*, 35*b* are arranged inside their respective blade spring spaces 37*a*, 37*b* such that the blades 38*a*, 38*b* of the blade springs 35*a*, 35*b* are engaged with an interior surface of their respective blade spring spaces 37*a*, 37*b* of the outer housing element 5. The interior surface is hidden on FIG. 2A, can an equivalent surface 740*a* is described and observable in the context of the fourth embodiment, described with reference to FIG. 10. Thus, the spring force of the blade springs 35*a*, 35*b* acts in the mating direction x against displacement exerted on the blade in the direction opposed to the mating direction x.

On the other side 25*b* of the inner housing element 3, not visible on FIG. 2A, pins are arranged in corresponding traversing holes and cam grooves of respective lever beams in a substantially symmetric manner to the above-described side 25*a*.

As an optional feature, a scuttle 4 is illustrated in FIG. 2A. The illustrated scuttle 4 takes the form of a traversing opening in the inner element 3. The scuttle 4 serves on one hand for the visual ascertainment of the equipment state of the receptacle inlet 13. In particular, the scuttle 4 can allow the visual ascertainment of the absence, or of the presence and type, of coding ring 17 equipped in the receptacle inlet 13. On the other hand, the scuttle 4 can provide a square edge of a protrusion for a form fit connection with a matching protrusion in the coding ring 17. For example, if the coding ring 17 is a molded monolith, the coding ring 17 can be inserted by elastic deformation in the inlet 13 of the inner housing element 3 until a protrusion establishes a form fit connection with an edge of the scuttle 4. The scuttle 4 can be included on either one of the sides of the connector 1 or omitted entirely.

FIG. 2A also illustrates the three-dimensional structure of the locker elements 7*a*, 7*b* arranged in the outer housing element 5, which will be described more in detail with reference to FIGS. 4A and 4B.

FIG. 2A further shows guiding depressions 41*a*, 41*b*, 41*c* formed in the inner surface 43*a* of the outer housing element 5 facing the first side 25*a* of the inner housing element 5. The guiding depressions 41*a*, 41*b*, 41*c* in the outer housing element 5 provide a space for the protrusion of the hinge 23*a*, the hinge 23*b* and the pins 27*a*, 27*b*, respectively, as well as for their movement along the mating direction x relative to the outer housing element 5. Not visible on this figure are similar guiding depression on the opposing side 25*b* of the connector, for providing room for the movement for the protrusions of the respective hinges and pins.

Thus, the outer housing element 5 can be moved back and forth along the mating axis A, or up and down in the view of FIG. 2A, relatively to the inner housing element 3 by pulling and pushing the outer element 5. In particular, the motion of the outer housing element 5 in a direction opposed to the mating direction x, for example from a manual push, transmits an effort on the two blades 38*a*, 38*b*. The blades 38*a*, 38*b* of the blade springs 35*a*, 35*b* exert an effort of the other end of the each of the lever beams 21*a*, 21*b*, 21*c*, 21*d* attached to the blade springs 35*a*, 35*b* on each short side 39*a*, 39*b* of the connector 1. In particular, a movement of blade 38*a* exerts an effort on the other end of attached lever beams 21*a*, 21*c*, and a movement of blade 38*b* exerts a load on the other end of attached lever beams 21*b* and corresponding one on the other side 25*b*. Each lever beam 21*a*, 21*b*, as well the corresponding ones on side 25*b*, pivots around its respective lever hinge 23*a*, 23*b* (and corresponding ones on side 25*b*) formed on the inner housing element 3.

In FIG. 2A, showing the inserted, but yet unmated, position, the relative motion of the outer housing element 5 with respect to the inner housing element 3 has not been initiated. In this embodiment, the lever beams 21*a*, 21*b* have a position essentially perpendicular to the mating direction x. Once the relative motion has been initiated, the lever beams rotate around the hinges 23*a*, 23*b*, including the blade springs 35*a*, 35*b*. The blade spring spaces 37*a*, 37*b* are conceived to provide space sufficient to allow the blade springs 35*a*, 35*b* to rotate angularly with the motion of the beams 21*a*, 21*b*. FIG. 4A for example shows the pivoted lever beam 21*a*, 21*b* and the angularly rotated blade springs 35*a*, 35*b*.

Additionally, the pivot motion of the beams 21*a*, 21*b*, around respective hinges 23*a*, 23*b*, from an effort on blades 38*a*, 38*b* induces a load on the pins 27*a*, 27*b*, 27*c*, 27*d* attached at the one end of each beam 21*a*, 21*b*, 21*c*, 21*d* (27*c*, 27*d* and 21*d* not visible on FIG. 2A). In particular, a motion of the blade springs 35*a*, 35*b* against the mating direction x provokes by means of the cam grooves 33*a*, 33*b* a motion in the opposing direction on the pins 27*a*, 27*b*, attached to the coupling element 31 (not visible). Thus, the pins 27*a*, 27*b*, move along the traversing holes 29*a*, 29*b*, in the inner housing element 3 and pull the coupling element 31, see elements 28*a*, 28*b* of FIG. 3, along the receptacle 15 in the mating direction x.

Figure 2C:
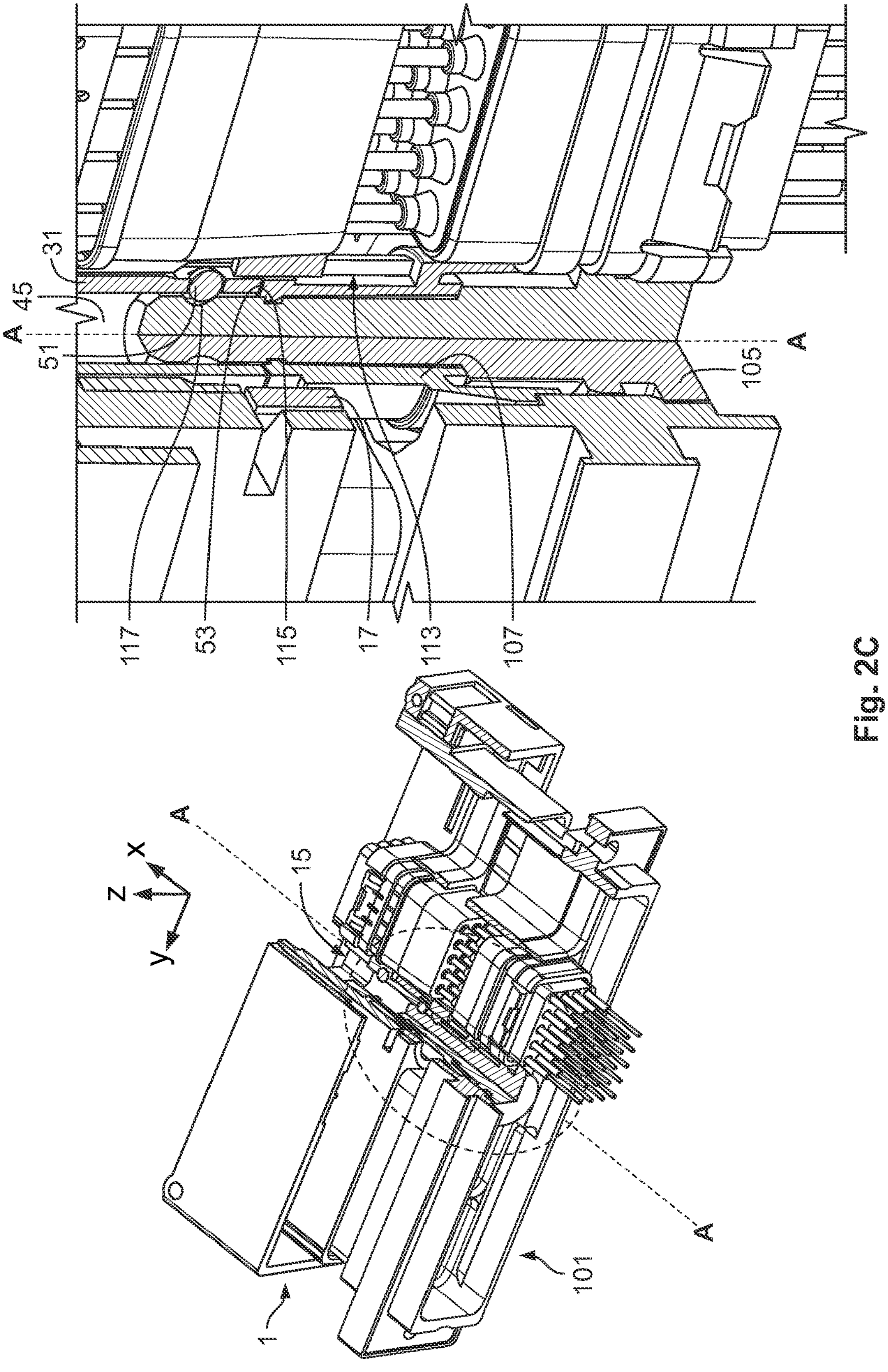
FIG. 2C displays partially sectioned and close-up view of FIG. 2B, wherein the connectors have moved from an inserted position to an engaged position.
Figure 3:
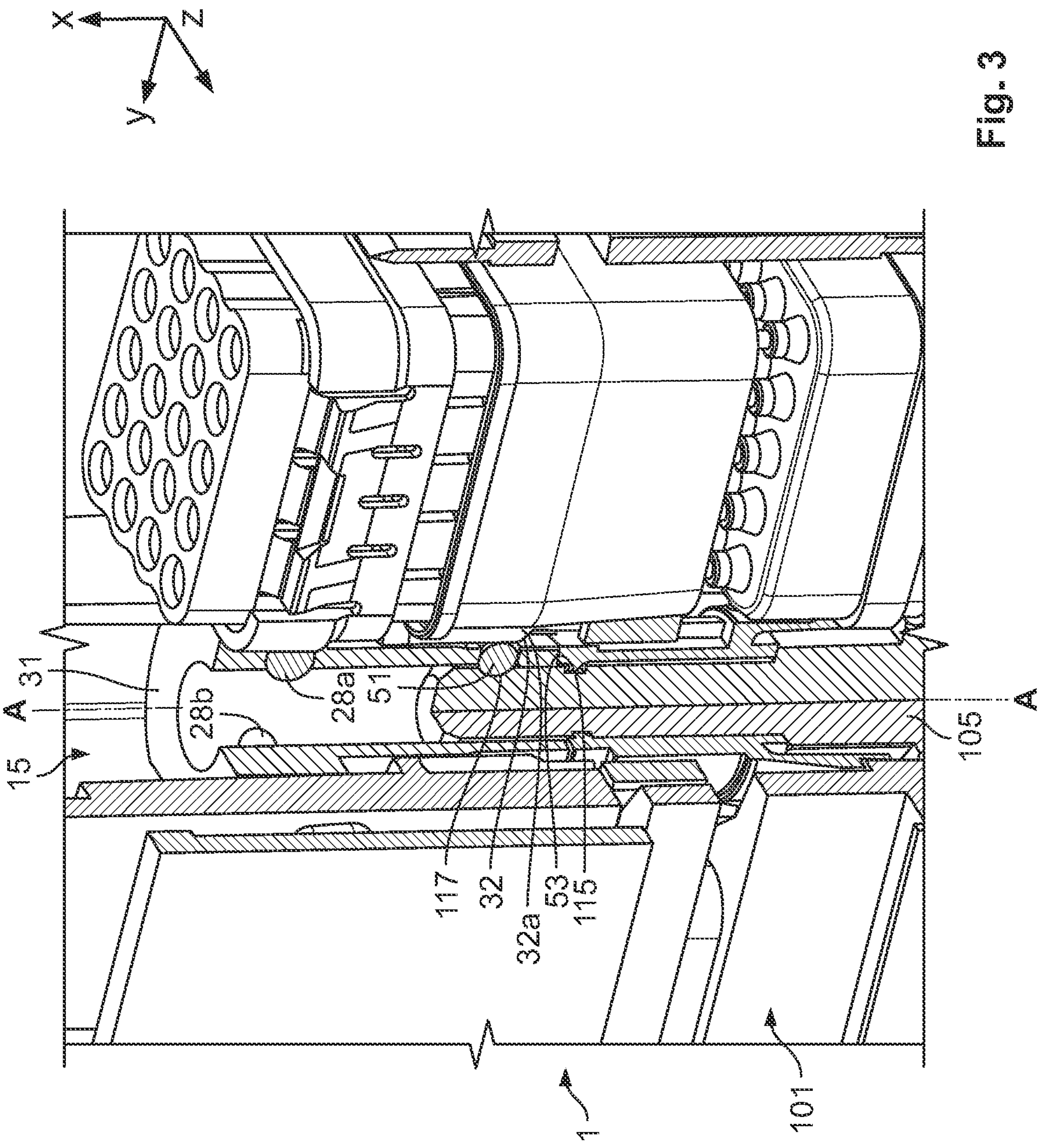
FIG. 3 displays the partially sectioned close-up view of FIG. 2C, wherein the connectors have moved from an engaged position to an intermediate coupled position.

Thus, according to the invention, the coupling element 31, as illustrated in FIGS. 2B, 2C and 3, arranged in the receptacle 15 of the inner housing element 3 is connected to the outer housing element 5 by means of a motion-reversing mechanical system. In this embodiment, the motion-reversing mechanical system comprises a lever system comprising four lever beams 21*a*, 21*b*, and two more on side 25*b*, arranged two-by-two on opposing sides 25*a*, 25*b* of the inner housing element 3 and pivoting around respective hinges 23*a*, 23*b*, and two more on side 25*b*, formed on the inner housing element 3.

In alternative embodiments, the motion-reversing mechanical system can be implemented differently from the above-described lever system. For example, in some embodiments, a double cam system can be implemented wherein the pins 27*a*, 27*b* are pushed by a moving part comprising diagonal groves for the pins 27*a*, 27*b*.

By virtue of the symmetric arrangement of the blade springs 35*a*, 35*b* on each short side 39*a*, 39*b* of the connector 1, and of the lever beams 21*a*, 21*b*, 21*c*, 21*d* on each side 25*a*, 25*b*, a force on one part of the outer housing element 5 ensheathing the inner housing element 3 is evenly distributed to the coupling element 31. As four pins 27*a*, 27*b*, 27*c*, 27*d* pull evenly on the coupling element 35, the interfacial sealing performance is improved, which can be notably advantageous for example for aeronautical or military-grade connectors.

The choice of materials and properties of the lever beams 21*a*, 21*b*, 21*c*, 21*d* and of the blade springs 35*a*, 35*b* is chosen based on the required interfacial sealing performance. For example, they are made out of steel or aluminum or plastic. In particular, the material can be chosen based on its elastic properties, for example the Young's modulus value.

FIG. 2B illustrates the connector 1 and second connector 101 in the same inserted position as FIG. 2A in a three-quarter sectional view, wherein one-quarter of the intersection of the x-y and y-z planes has been removed to allow visibility into the connector 1. A section of the three-quarter sectional view has been enlarged for further visibility of detail.

For illustration purposes, the connector 1 and the second connector 101 are in this Figure equipped with electrical modules 43*a*2, 143*a*2 in the respective sub-compartments 19*a*2, 119*a*2, while sub-compartments 19*a*1, 119*a*1 remain empty. In particular, sub-compartment 19*a*2, is equipped with a female electrical module 43*a*2 and sub-compartment 119*a*2 is equipped with a male electrical module 143*a*2. The electrical modules 43*a*2 is a cuboid-shaped module comprising female electrical terminals 44. The electrical module 143*a*2 43*a*2 is a cuboid-shaped module comprising male electrical terminals 144. The electrical modules 43*a*2, 143*a*2 are fit into their respective sub-compartments 19*a*2, 119*a*2 such that the electrical terminals 44 face the electrical contacts 144.

The three-quarter sectional view of FIG. 2B, shows the inner housing element 3 and the outer housing element 5 (not rendered transparent) of the connector 1, as well as the locker element 7*a*. Inside the inner housing element 3, the coupling element 31 with a hollow 45 is arranged in the receptacle 15.

The receptacle 15 comprises a ledge part 32 in an annular shape, fitted to an inner circumference of the receptacle 15. The ledge part 32 comprises a ledge projection 32*a* which projects inwards and is chamfered, or shoulder-like, such that the ledge projection 32*a* of the ledge part 32 is diagonal to the mating axis A. The ledge projection 32*a* is located at a predetermined distance d of the receptacle inlet 13, along the mating axis A from the inlet 13. In particular, the predetermined distance is of less than 25%, preferably between 5% and 10% of the extension of the receptacle 15 along the mating axis A.

A distal extremity 106*b* of the central plug 105 of the second connector 101 is partially inserted through the receptacle inlet 13 and the coding ring 17.

The coupling element 31 will be further described with reference to the enlarged view of FIG. 2B.

The coupling element 31 comprises a hollow 45 extending coaxially with the mating axis A throughout the coupling element 31. The coupling element 31 has a tubular coupling portion 47 and a head portion 49. In the wall of the tubular coupling portion 47, a ball 51 of a ball locking means is disposed such that the center of the ball 51 has a range of movement on either side of the tube wall, i.e. in a direction orthogonal to the mating direction x.

In alternative embodiments, the ball locking means can comprise several balls, in particular several balls disposed in the tubular coupling portion 47 at the same axial location with respect to mating axis A as ball 51, but at different angles around the mating axis A. For example, the tubular housing portion 47 can comprise in addition to ball 51 two further balls located at angles of +120° and 120° respectively around mating axis A, with respect to the location of ball 51. This allows for an advantageous distribution of the coupling forces of the ball locking means on the plug 105 around the mating axis A, the intermediate coupled position described with reference to FIG. 3.

The tubular coupling portion 47 presents at its distal end with respect to the side where the connection with the second connector 101 occurs the head portion 49, and presents at its proximal end with respect to the side where the connection with the second connector 101 occurs an engagement surface 53.

The enlarged view of FIG. 2B also shows a cross-section of a pin middle part 28*a*, which traverses the head portion 49 of the coupling element 31 in a direction z orthogonal to the mating direction x. The pin middle part 28*a* links together the pin 27*a* which protrudes from the head portion 49 with the corresponding pin on the other side 25*b* of the connector 1. In mirror symmetry with respect to the x-z plane, but not visible on FIG. 2B, a pin middle part 28*b* links the pin 27*b* with the corresponding pin on the other side 25*b* protruding from the head portion 47. According to a variant, pin 27*a* and 27*b* can extend through the coupling element 31, such they form one part with middle parts 28*a*, 28*b* and the corresponding pins on the other side 25*b*.

On the side of the second connector 101, the plug 105 is equipped with the coding clip 107. The coding clip 107 comprises a coding shape 113 in the form of a depression in a cross-section of the clip 107. The coding shape 113 is configured to be matched to a matching coding shape 55 of the coding ring 17 during the insertion, in the form of a protrusion in a cross-section of the coding ring 17. In this way, in the absence of matching coding shapes between the clip 107 and the coding ring 17, the insertion of the plug 105 is blocked by the protrusion of the coding shape 55 of the ring 17 that does not match with the coding clip 107. Thus, the coding ring 17 together with clip 107 constitute a fool proofing system, which blocks the mating of a wrong or unintended connector 1 with the second connector 101.

The coding clip 107 comprises at its distal end with respect to the mating direction x an engagement surface 115. As will be explained in the following figures, the engagement surface 115 of the clip 107 is destined for engagement with the engagement surface 53 of the coupling element 31.

The plug 105 presents at its distal extremity 106*b* a notch 117. The notch 117 is radially symmetric around the mating axis A coaxial to the central axis of the plug, and presents a hemi-circular shape in the cross-section of the plug 105 with respect to the x-z plane along the mating axis A. As will be explained in the following figures, the notch 117 is destined to receive the ball 51 to couple the plug 105 with the coupling element 31.

The plug 105 further presents in at its distal extremity 106*b* a dent 121. The dent 121 can be radially symmetric around the mating axis A coaxial to the central axis of the plug and presents a square shape in the cross-section of the plug 105 with respect to the x-z plane along the mating axis A. A jut 123 of the coding clip 107 is received in the dent 121. Thus, a form fit connection between clip 107 and plug 105 is established that blocks the axial displacement of the coding clip 107 with respect to plug 105.

In the inserted position displayed in FIG. 2B, the plug 105 has been partially inserted in the hollow 45 of the coupling element 31, and the coding clip 107 has been partially inserted in the coding ring 17. However, in this initial insertion position, the engagement surface 115 of the clip 107 is not yet engaged with engagement surface 53 of the coupling element 31. The plug 105 has not yet abutted on the coupling element 31.

Further, the coding shape 55 of the coding ring 17 has not yet been inserted in the matching coding shape 113 of the coding clip 107. Thus, the fool proofing test has not yet been passed.

In addition, in this inserted position, the ball 51 of the ball locking means has not been pushed into the notch 117 of the plug 105. Thus, the plug 105 is not yet coupled with the coupling element 31.

Finally, in this initial insertion position, the electrical contacts 144 of the male module 143*a*2 are not yet inserted in the electrical terminals 44 of module 43*a*2.

FIG. 2C corresponds to the three-quarter sectional view of the connector 1 and the second connector 101 of FIG. 2B, wherein in the connectors 1, 101 have moved from an insertion position to an engagement position. In the engagement position, the connectors 1, 101 have been moved a closer together such the plug 105 is moved further inwards into the hollow 45 of the coupling element 31. In particular, the plug has moved inwards until the engagement surface 53 of the coupling element 31 abuts against the engagement surface 115 of the coding clip 107.

In the engagement position, the coding shape 113 of the clip 107 has been matched by the coding shape 55 (not visible) of the coding ring 17. Thus, the fool proofing test has been passed.

At the same time of the abutment of engagement surfaces 53, 115, the ball 51 of the ball locking means is lodged in the notch 117 of the plug 105. In this position, the ball 51 is loosely lodged in the corresponding notch 117. Thus, as the ball 51 is free to be moved outside the notch 117, the plug 105 and the coupling element 31 are not coupled. In particular, if the connectors 1, 101 are separated again, i.e. if the connector 1 is moved in mating direction x away from the mating connector 101 such that the abutment of surfaces 53, 117 is released, the ball 51 can exit the notch 117 by moving transversally away from the mating axis A.

However, in this engagement position, since the clip 107 of the plug 105 and the coupling element 31 abut at the surfaces 53, 117, should the connectors 1, 101 be moved further together, the coupling element 31 will move in mating direction x along the receptacle 15 in conjunction with the plug 105.

FIG. 3 displays the same enlarged view of a three-quarter section as seen in FIG. 2B and FIG. 2C. Here, a situation is shown, in which the connector 1 and the second connector 101 have moved from the engagement position to the intermediate coupled position. In this view, the connectors 1, 101 have been even further moved together, for example by manually pushing the connector 1 on the second connector 101, such that the plug 105 has moved further inwards the receptacle 15. Through the engagement of surfaces 53, 115, as described above, the movement of the plug 105 has also pushed the coupling element 31 inwards the receptacle 15.

In this intermediate coupled position, the further inwards movement of the coupling element 31 along the receptacle 15 in mating direction x has caused the ball 51 in the coupling element 31 to hit, and be displaced by, the ledge projection 32*a* projecting inwards into the receptacle 15. The chamfering of the ledge projection 32*a* serves to soften the contact of the ball 51 on the ledge projection 32*a*, and allows the ball 51 to travel beyond the ledge projection 32*a* in the mating direction x.

As the circumference of the receptacle 15 is narrower beyond the ledge projection 32*a* in mating direction x, than in front of it, the ball 51 is now firmly lodged and pushed into the notch 117 of the plug 105. In this intermediate coupled position, the ball 51 is blocked from being displaced out of the notch 117 by the narrower portion of the receptacle 15. Thus, in the intermediate coupled position, the plug 105 of the second connector 101 and the coupling element 31 are locked to move in conjunction.

Further, the coupling element 31 is connected to the outer housing element 5 by the pin middle parts 28*a*, 28*b*, which link respectively the (not visible) pins 27*a*, 27*c* and 27*b*, 27*d* that are in connection with the lever system.

Thus, a force in the direction opposite the mating direction x onto the outer housing element 5 translates by means of the motion-reversing mechanical system to a force in opposite direction along the mating direction x on the connector 101. In other words, pushing the outer housing element 5 towards the second connector 101 against the mating direction x simultaneously pulls the second connector 101 in mating direction towards the connector 1, thus finalizing the mating of the connectors 1, 101.

This is enabled by the ball locking means, as the ball 51 is firmly lodged in the notch 117 of the plug and thereby ensures a secure coupling of the coupling element 31 with the plug 107. It provides a high reliability coupling while taking up little space in the connector 101, and in particular does not require manual input or assistance from a user to operate. For example, it removes the need for a screw connection or screw locking of the connectors.

Starting from the intermediate coupled position of FIG. 3, the mating connectors 1, 101 can be further moved towards each other until the mating is finalized, meaning, until the mating of connectors 1 and 101 has reached the required sealing tightness. When the mating is finalized, the connectors 1, 101 will be in mated position, as illustrated in FIG. 4A. In the mated position, the electrical connection between the electrical modules 43*a*2 and 143*a*2 is correctly and reliably established.

Figure 4A:
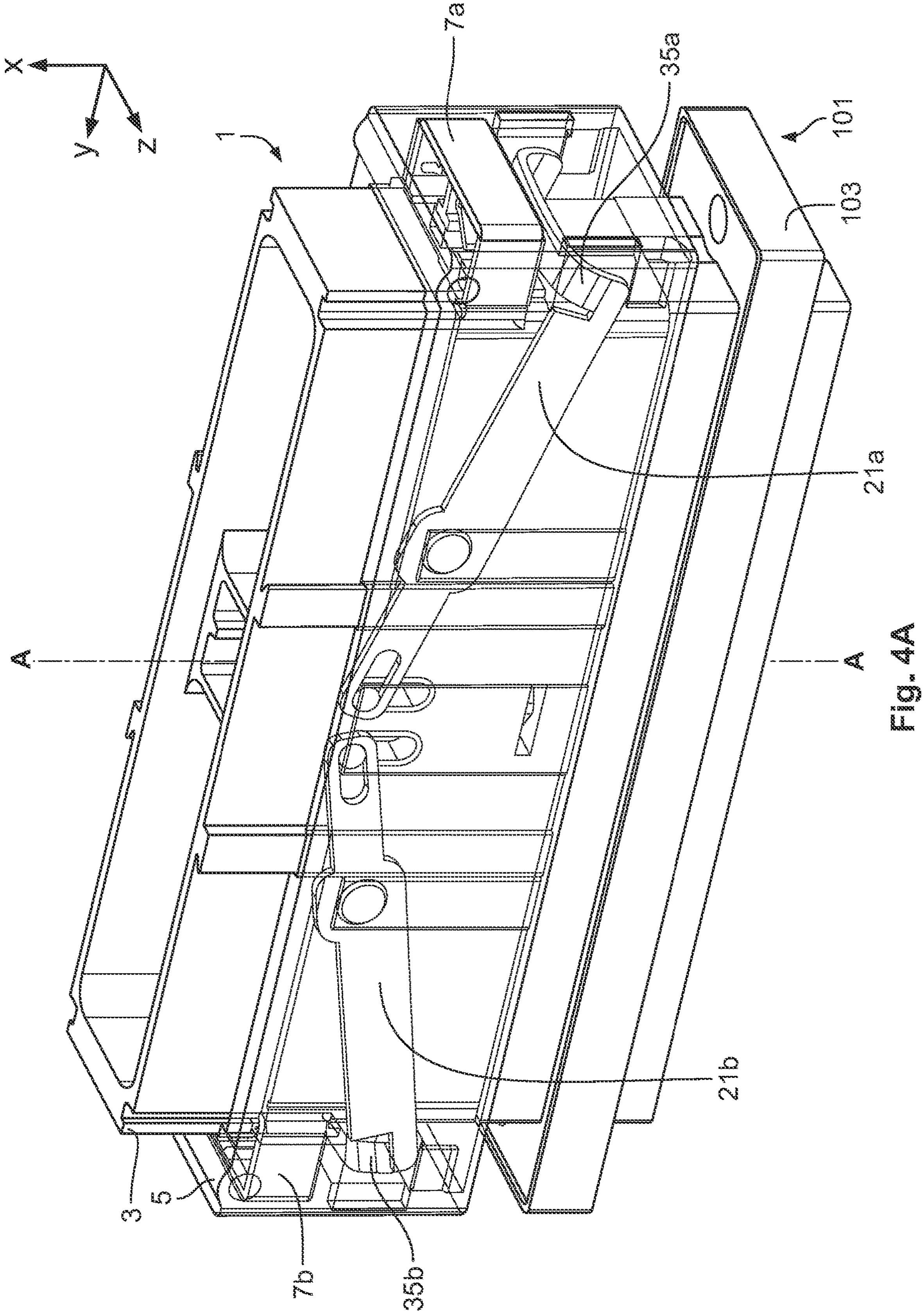
FIG. 4A displays the connectors of the first embodiment in a mated and locked position, wherein the outer housing element is rendered semi-transparent.

FIG. 4A displays the connectors 1, 101 of the first embodiment in a locked position a semi-transparent view. In the locked position, not only are the connectors 1, 101 fully mated, but also additionally, they are firmly locked with each other so as be resistant to an inadvertent uncoupling motion.

The outer housing element 5 has been pushed towards the second connector 101 relatively to the inner housing element 3, thus pulling the second connector 101 towards the connector 1 in mating direction x, until the connectors 1, 101 are fully mated. In this mated position, the inner housing element 3 abuts on the main body 103 of the second connector 101 and the pins 27*a*, 27*b* have reached the end of their movement range in mating direction x in the elongated space of the oblong traversing holes 29*a*, 29*b*.

Further, in FIG. 4A, the connector 1 has been moved from a mated position, to a locked position by the activation of the locking mechanism comprising the locker elements 7*a*, 7*b*.

The locking mechanism will be explained with reference to FIG. 4B, which displays a close-up view of the locker element 7*a* when the connector 1 is in a locked position.

The locker element 7*a* comprises an actuation body 57, in the shape of a flat cuboid extending in a plane parallel to the x-z plane, and two lateral arms 59*a*, 59*b* extending from the two opposing short ends 61*a*, 61*b* of the actuation body 57. Both lateral arms 59*a*, 59*b* extend from the attached ends 61*a*, 61*b* in a direction y orthogonal to the mating direction x towards the inner housing element 3. At the ends opposed to the short ends 61*a*, 61*b*, the lateral arms 59*a*, 59*b* each comprise a hook 63*a*. The hook of lateral arm 59*b* is not visible.

The locker element 7*a* further comprises two spring elements 65*a*, 65*b* attached to the actuation body 57. The spring elements 65*a*, 65*b* are blade springs that extend diagonally from a surface 67 of the actuation body 57 facing the inner housing element 3, and abut on an outer short surface 69*a* of the inner housing element 3.

The locker element 7*a* is disposed in a dedicated locker space 71 inside the outer housing element 5 disposed on the short side 39*a* of the connector 1. The locker element 7*a* is moveably arranged along a direction y perpendicular to the mating axis A inside the dedicated locker space 71 of the outer housing element 5.

The spring elements 65*a*, 65*b* are pre-loaded such that their abutment on the outer short surface 69 of the inner housing element 3 exerts a force on the actuation body 57, pushing the actuation body 57 outwards of the outer housing element 5 in a direction opposed to the direction y orthogonal to the mating direction x. The outward movement of the actuation body 57 is blocked by the hooks 63*a*, 63*b* which grip into a ridge 73 extending along the outer housing element 5 along the mating axis A. Thus, in an unmated state, the spring elements 65*a*, 65*b* are maintained in the pre-loaded state and the actuation body 57 of the locker element is kept inside the outer housing element 5.

As the outer housing element 5 is moved long the mating axis A during the coupling movement in a direction opposed to the mating direction x, the hooks 63*a*, 63*b* slide along the extension of the ridge 73. Once the connector 1 has reached a mated position with the second connector 101, and the outer housing element has ready a predetermined distance its movement relative to the inner element 3 along mating axis A, the hooks are slid into a notch 75 in the ridge 73 and establish a positive form lock in the notch 75. The pre-loaded state of the spring elements 65*a*, 65*b* exerts an outward force on the actuation body 57, which translates into an automatic outward movement of the locker element when the hooks 63*a*, 63*b* slide into the notch 75 in the ridge 73.

When the hooks 63*a*, 63*b* are lodged in the notch 75, the positive form lock blocks the outer housing element 5 from moving relatively to the inner housing element 3 along the mating axis A. Thus, the outer housing element 5 is locked in position and the second connector 101 can no longer be uncoupled from the connector 1, and the connector 1 is transitioned from a mated position to a locked position.

Figure 4B:
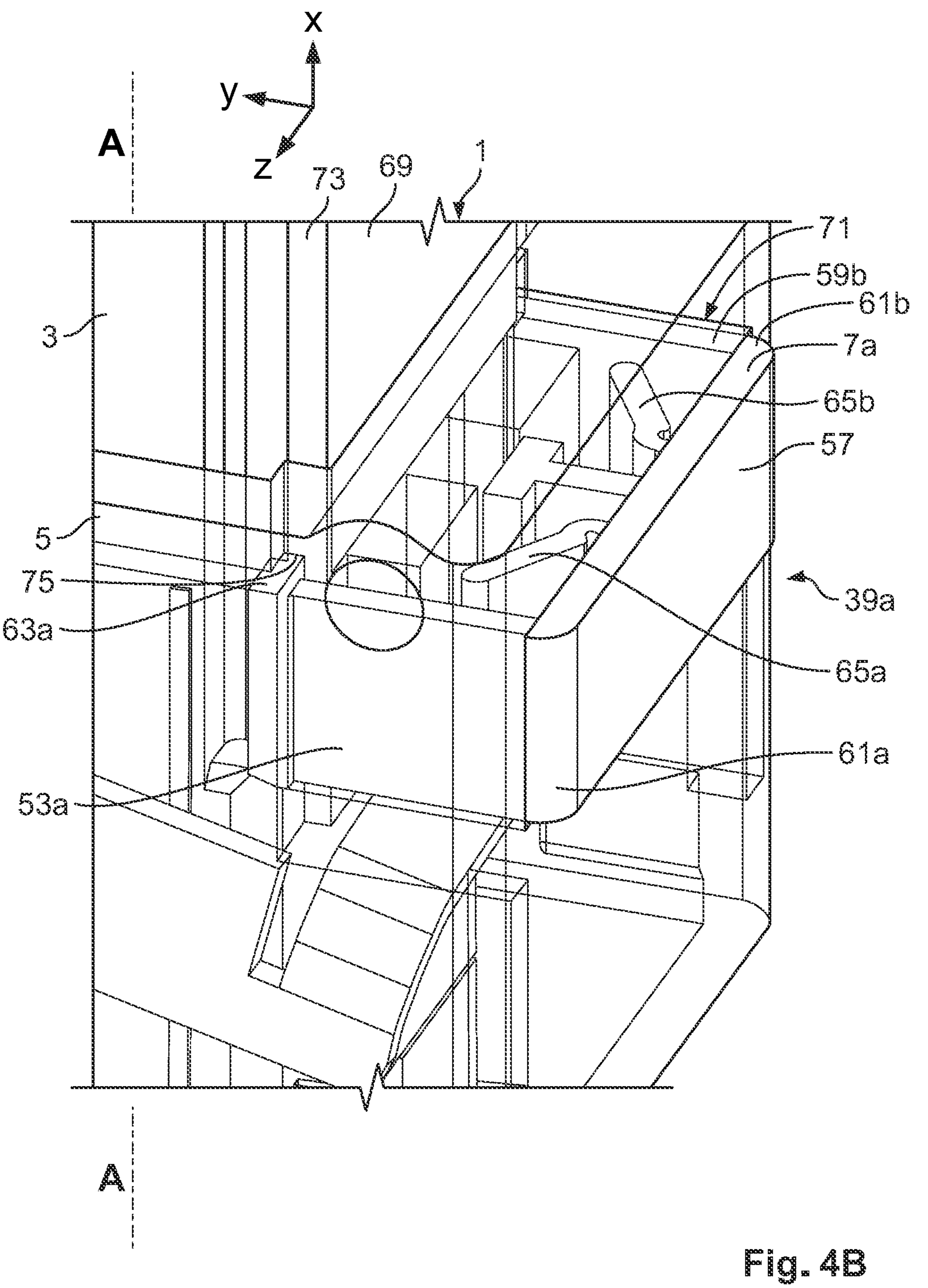
FIG. 4B displays a close-up view of the locking system of the connector in the locked position of FIG. 4A.

In FIG. 4B, the hook 63*a* is lodged in the notch 75 and the actuation body 57 is moved outwardly from the inner housing element in a direction opposed to the direction y orthogonal to the mating direction x. The movement of the actuation body 57 relative to the outer housing element 5 causes a portion of the actuation body 57 to protrude from the outer housing element 5 on the short side 39*a* of the connector 1.

This protrusion serves as a visual indicator and allows the user to visually ascertain the locked state of the connector. In an advantageous embodiment, the actuation body can be colored distinctly from the color of the outer housing element 5 to further facilitate the visual ascertainment of the locked state of the connector 1.

The unlocking of the connector 1 is achieved by freeing the blocked relative movement of the outer housing element 5 with respect to the inner housing element 3 along the mating axis A. This can be realized by exerting a force on the actuation body 57, in particular a force in a direction y orthogonal to the mating direction x, which counteracts the spring force of the spring elements 65*a*, 65*b* such that the locker element 7*a* is moved in the direction y. When the locker element 7*a* is moved in the direction y, the hooks 63*a*, 63*b* as dislodged from the notch 75 and can be slid along the ridge 73 in the mating direction x.

Thus, the locker element 7*a* ensures a secure locked position of the connectors 1, 101, while providing reversibility and manual accessibility of the unlocking function.

The connection mechanism described hereinabove, comprising the successive stages of insertion, engagement, coupling, mating, and locking, can be implemented by one single fluid manual motion on the outer housing element 5, while ensuring sufficiently secure and tight mating of the connector 1 with the second connector 101.

A coding clip according to a second embodiment of the invention will be described with reference to FIGS. 5A to 8. The coding clip described with reference to FIG. 5A is suitable to be used as coding clip 107 for the first embodiment of the invention described hereinabove.

Figure 5A:
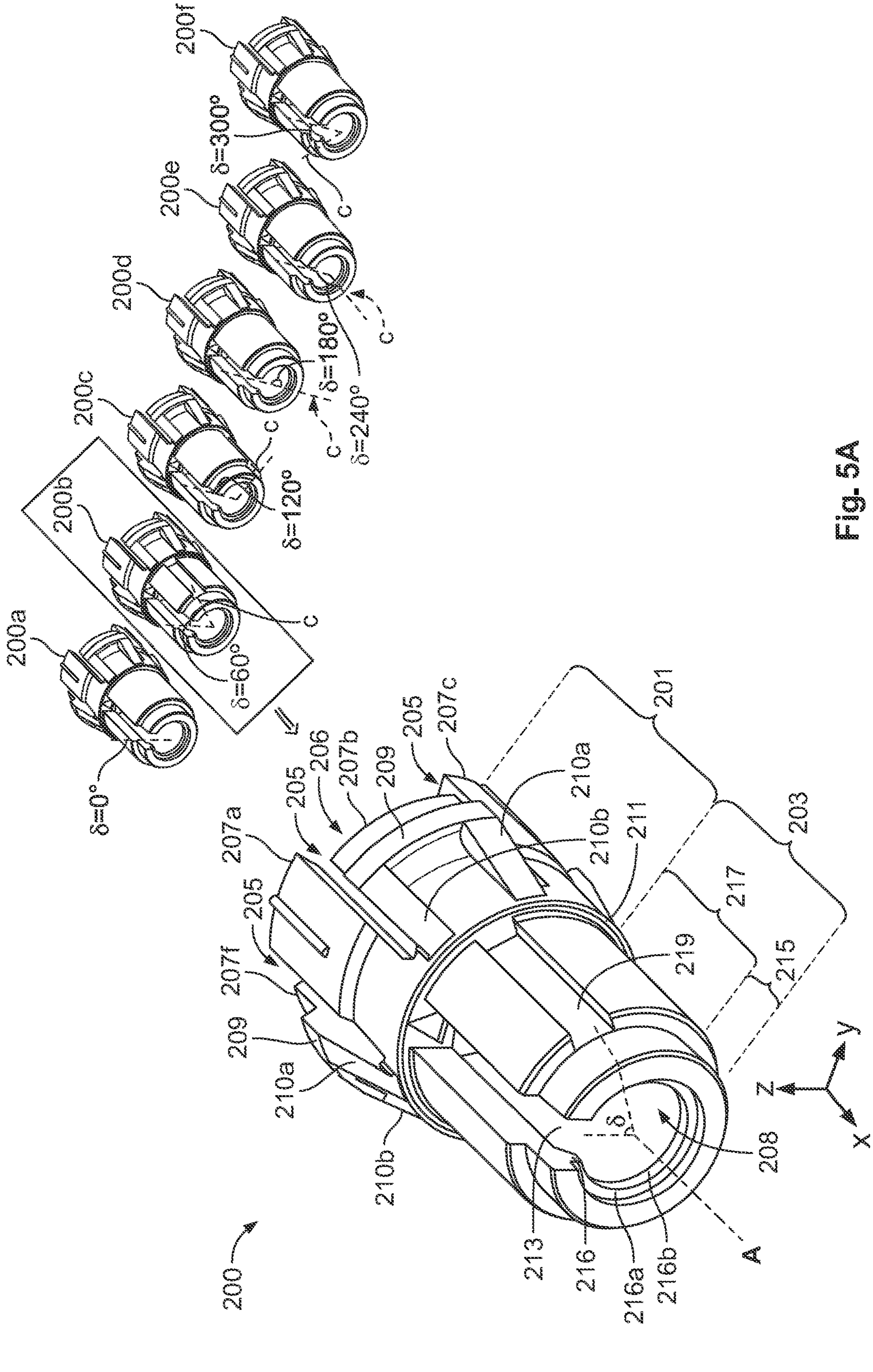
FIG. 5A displays six coding clips according to a second embodiment of the invention, including a close up view of one of the six coding clips.

FIG. 5A shows an enlarged view of a coding clip 200 arbitrarily selected amongst a selection, for example here six, coding clips 200*a-f*, each having a distinctive alternative encoding or fool-proofing coding shape, indicated with C in the drawing.

The coding clip 200 is an injection-molded monolith in ULTEM® material. The coding clip 200 comprises a first portion 201 and a second portion 203 having a substantially annular cross-section in the y-z plane perpendicular to the mating direction x. The coding clip 200 is colored uniformly in a color according to a color-coding scheme.

The first portion 201 comprises six slits 205 extending, from an opening at one end 206 of the clip 200, in the mating direction x. The slits 205 separate the first portion 201 into six sub-portions 207*a*-207*f*. Only sub-portions 207*a*, 207*b*, 207*c* and 207*f* are visible on FIG. 5A.

Three of the sub-portions 207*a*-207*f*, namely every other one of the sub-portions, i.e. sub-portions 207*b* and 207*f* visible in FIG. 5, comprise a protrusion 209. The protrusions 209 extend in a direction orthogonal to the mating direction x outwardly with respect to the axis A of the clip 200. Two nose shaped reinforcement elements 210*a* and 210*b* extend from each protrusion 209 along axis A in the mating direction x.

The other three sub-portions, of which sub-portions 207*a*, 207*c* are visible in FIG. 5A, are longer than the sub-portions 207*b*, 207*f*, and do not comprise a protrusion in a direction orthogonal to the mating direction x. The inner surfaces (not visible) of those sub-portions 207*a*, 207*c* are flat and parallel to the axis A, and arranged so as to match the hexagonal shape of the first body part 307 of the plug 300. In other words, an inner circumference of the cross-section of the first portion 201 of the clip 200 in the y-z plane perpendicular to the mating direction x, in particular in a region between the intersection 211 of the first portion 201 and the second portion 203 and the first end 206, forms three sides of a hexagonal shape. In particular, the inner surfaces of sub-portions 207*a*, 207*c* (207*e* not visible) form three sides of a hexagonal shape. The inner circumference with a hexagonal shape is not visible in FIG. 5A but will be better understood in the following.

As will be explained further down, the matching of the sub-portions 207*a*, 207*c* with the surfaces 307*a*, 307*c* of the hexagonal shape of the plug 300 block any rotational displacement of the coding clip 200 when it is mounted on the plug 300.

The second portion 203 of the clip 200 comprises a slit opening 213 in the substantially annular cross-section of the clip 201. The slit opening 213 extends from the other end 208 of the clip 200 in the direction opposed to the mating direction x.

The second portion 203 further comprises a fitting portion 215 at the other end of the clip 200, and a coding portion 217 between the fitting portion 215 and the intersection 211.

The fitting portion 215 comprises on the internal side of the clip 200 a jut 216, with a triangular section, which projects inwards inside the clip 200. The jut 216 has a first surface 216*a* that faces in the mating direction x and is parallel to the y-z plane perpendicular to the mating direction x. The jut 216 has a second surface 216*b* that is diagonal, or chamfered, with respect to the axis A of the clip, and faces partially in the direction opposed to the mating direction x. As will be explained later, the jut 216 is used to realize a form fit connection with a corresponding depression in the form a square dent 311 of the plug 300. The chamfered surface 216*b* facilitates the establishment of the form fit connection.

The fitting portion 215 furthermore has a narrower cross-section in the plane y-z perpendicular to the mating direction x, than the equivalent cross-section of the coding portion 217. The narrowed fitting portion 215 provides an initial stability during insertion, before the coding test provided by the coding portion 217.

The coding portion 217 comprises a coding shape 219, whose location and dimensions can vary according to the selected exemplary encoding C. The coding shape allows for a safe and secure fool proofing of a connection. Thus, the risk of material or electrical damage from a wrong mating of connectors is reduce. The coding shape 217 in this embodiment has the form of a groove on the outer side of the coding portion 217 and extends in parallel to the mating axis A of the clip 200. The different encodings C are defined by the angle δ of the coding shape 219 with respect to the slit opening 213. Each encoding C has a different angle δ. For example, for six encoding types C, the angle of each encoding can be $\delta=n*\pi/3$, wherein n=0, 1, 2, 3, 4 or 5.

The manufacture of the clip 200 as an injection-molded ULTEM® monolith allows a durability and resistance to degradation that is at least equivalent to, for example, molding a coding shape direction onto the plug 300.

By coloring the clip 200 uniformly according to a color-coding scheme as a function of the position of the coding shape 219, an additional secondary fool proofing is provided, securing against mating with a wrong counterpart.

Figure 5B:
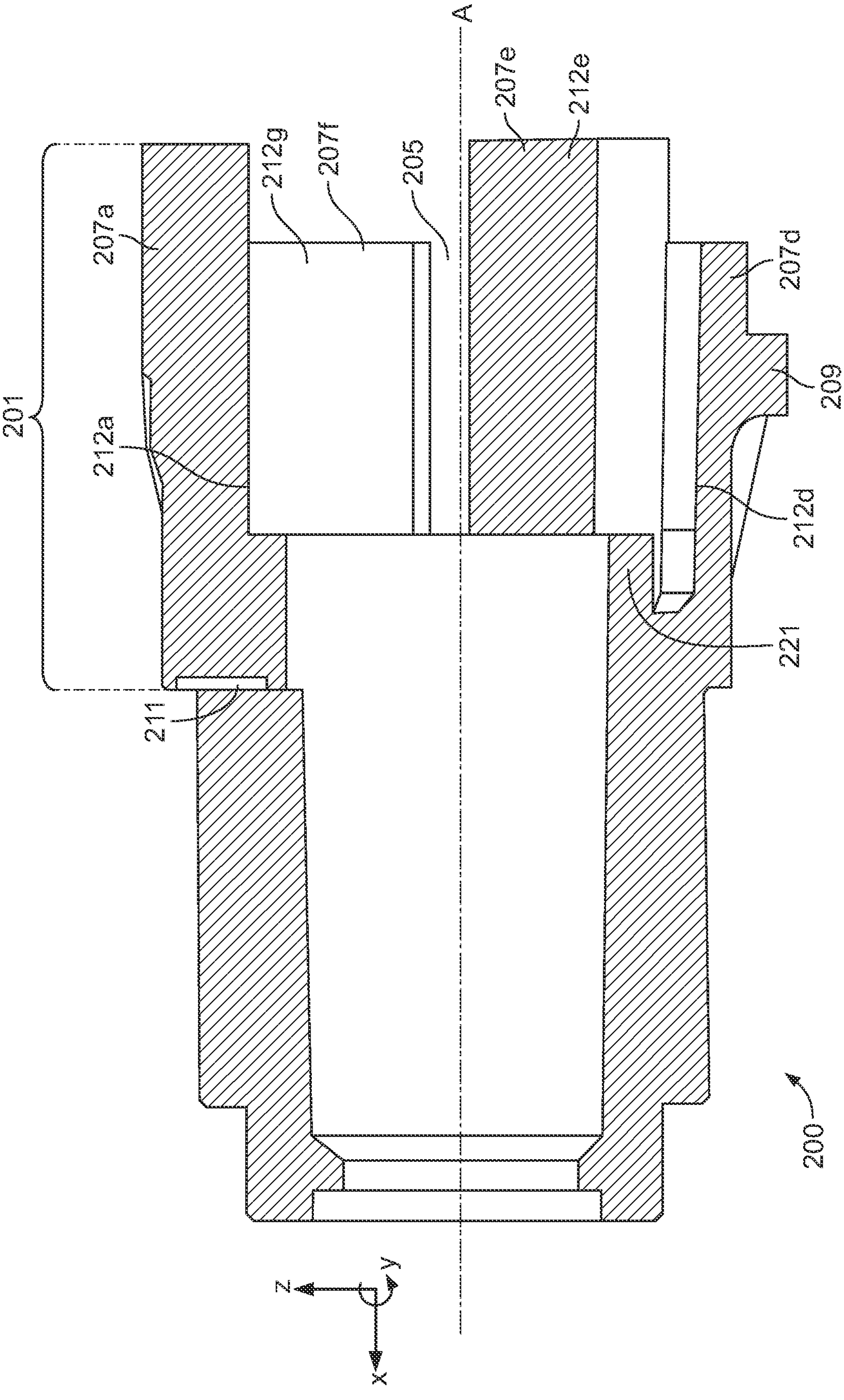
FIG. 5B displays a cross-sectional view along the axis A of the coding clip of FIG. 5A.

FIG. 5B displays the clip 200 in a cross-section along the axis A. The cross-section shows the first portion 201, which includes the sub-portions 207*a*-207*f*, of which only sub-portions 207*a*, 207*d*, 207*e* and 207*f* are visible. The sub-portions are separated by slits 205 and are united with the clip 200 at the intersection 211. FIG. 5B shows again that every other sub-portion 207*d*, 207*f* is shorter and comprises a protrusion 209 that extends outwardly, as well as an internal protrusion 221.

Meanwhile, the remaining sub-portions, 207*a*, 207*e* are thin and substantially flat, such that their inner surfaces 207*a*, 207*e* are suited to be matched and fitted to corresponding surfaces 307*a*, 307*e* of the plug.

In addition, the inner surfaces 212*d*, 212*f* of the sub-portions 207*d*, 207*f* are more distant from the clip axis A than the inner surface 212*a*, 212*e* of the sub-portions 212*a*, 212*e*. The function of this differential of distance from the clips axis A, as well as of the internal protrusions 212 and the outer protrusions 209 will be explained with reference to FIG. 8.

An exemplary use of the coding clip 200 is described with reference to FIGS. 6, 7 and 8.

Figure 6:
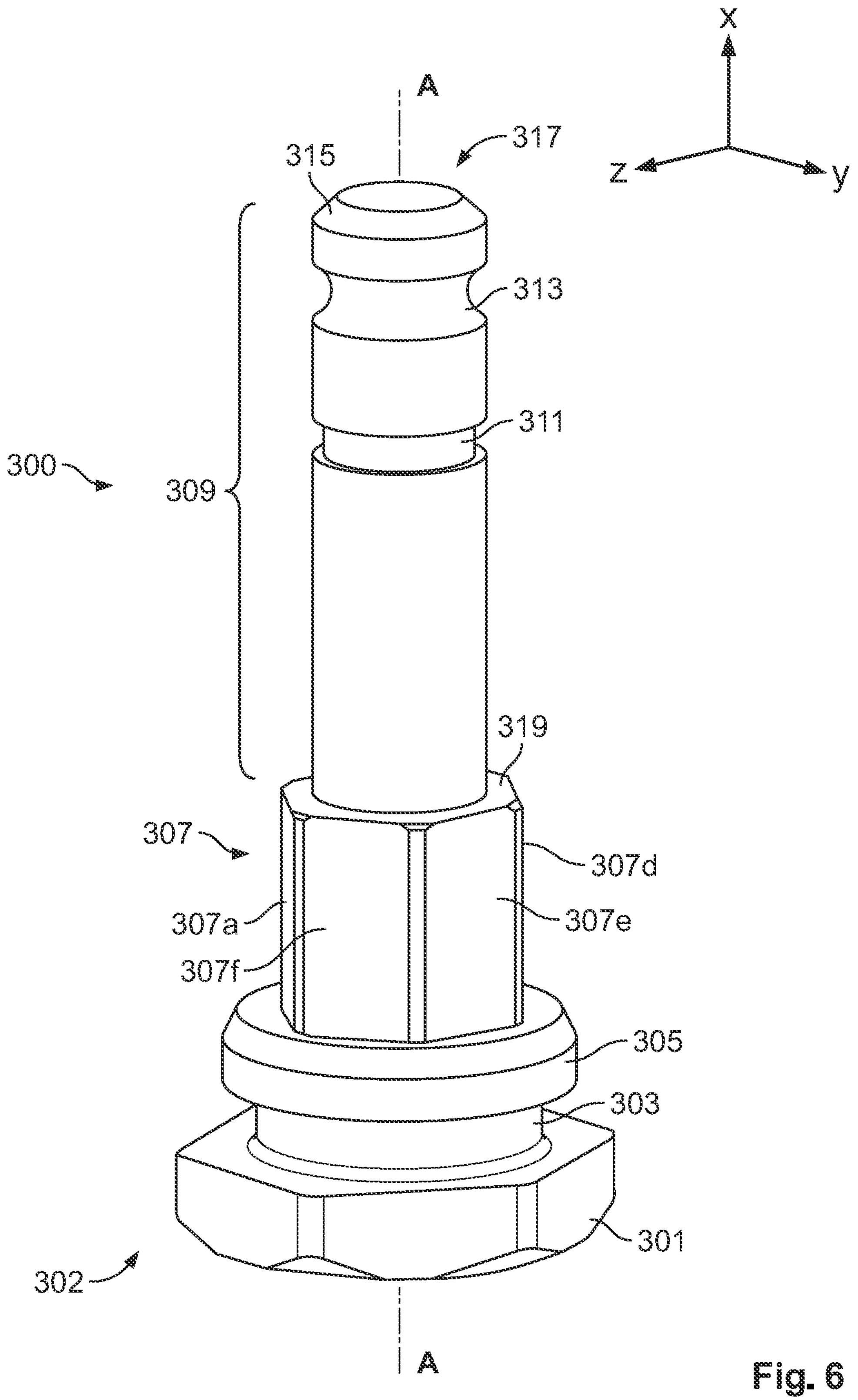
FIG. 6 displays a plug of a plug assembly according to a third embodiment of the invention.

FIG. 6 displays a plug 300 suitable to receive the coding clip 200 described with reference to FIG. 5A. The plug 300 comprises an enlarged head 301 at a first end 302 of the plug 300, a first cylindrical portion 303, a second cylindrical portion 305, first body part 307 and a second body part 309.

The enlarged head 301 has a hexagonal cross-section in the y-z plane perpendicular to the mating direction x. The area of said hexagonal cross-section is the largest area of cross-section of the plug 300 cross-sections in the y-z plane perpendicular to the mating direction x.

The diameter of the cross-section of the second cylindrical portion 305 is larger than the diameter of the cross-section of the first cylindrical portion 303. The first body part 307 has a hexagonal cross-section in the y-z plane perpendicular to the mating direction x, comprising six individual surfaces 307*a*-307*f* (only 307*a*, 307*b* and 307*c* visible on FIG. 7A). The hexagonal cross-sectional area of the first body part 307 is smaller than the hexagonal cross-sectional area of the head 301.

The diameter of the first cylindrical portion 303 is narrowed compared to the diameter of the second cylindrical portion 305 to provide the possibility of arranging a sealing O-ring in between the enlarged head 301 and the second cylindrical portion 306. This can increase the sealing performance of a plug assembly 400 inserted in a connector 501, as will be described in the following.

The second body part 309 has a cylindrical shape and comprises a square dent 311 and a rounded notch 313, and a chamfer 315 at the second end 317, also called distal end, of the plug 300.

The square dent 311 is configured to receive the matching jut 216 of the coding clip 200 to allow the establishment of a form fitting which blocks the axial displacement of the clip 200 along the mating axis A when mount onto the plug 300.

The rounded notch 313 can receive the ball of a ball locking means. Thus, the plug is compatible to be coupled with a part comprising a ball locking means. This is for example illustrated in FIG. 3 of the first embodiment.

The chamfer 315 simplifies the guidance when the plug 300 is inserted into a receptacle of a mating second connector, like the mating second connector 101 of the first embodiment.

Figure 7A:
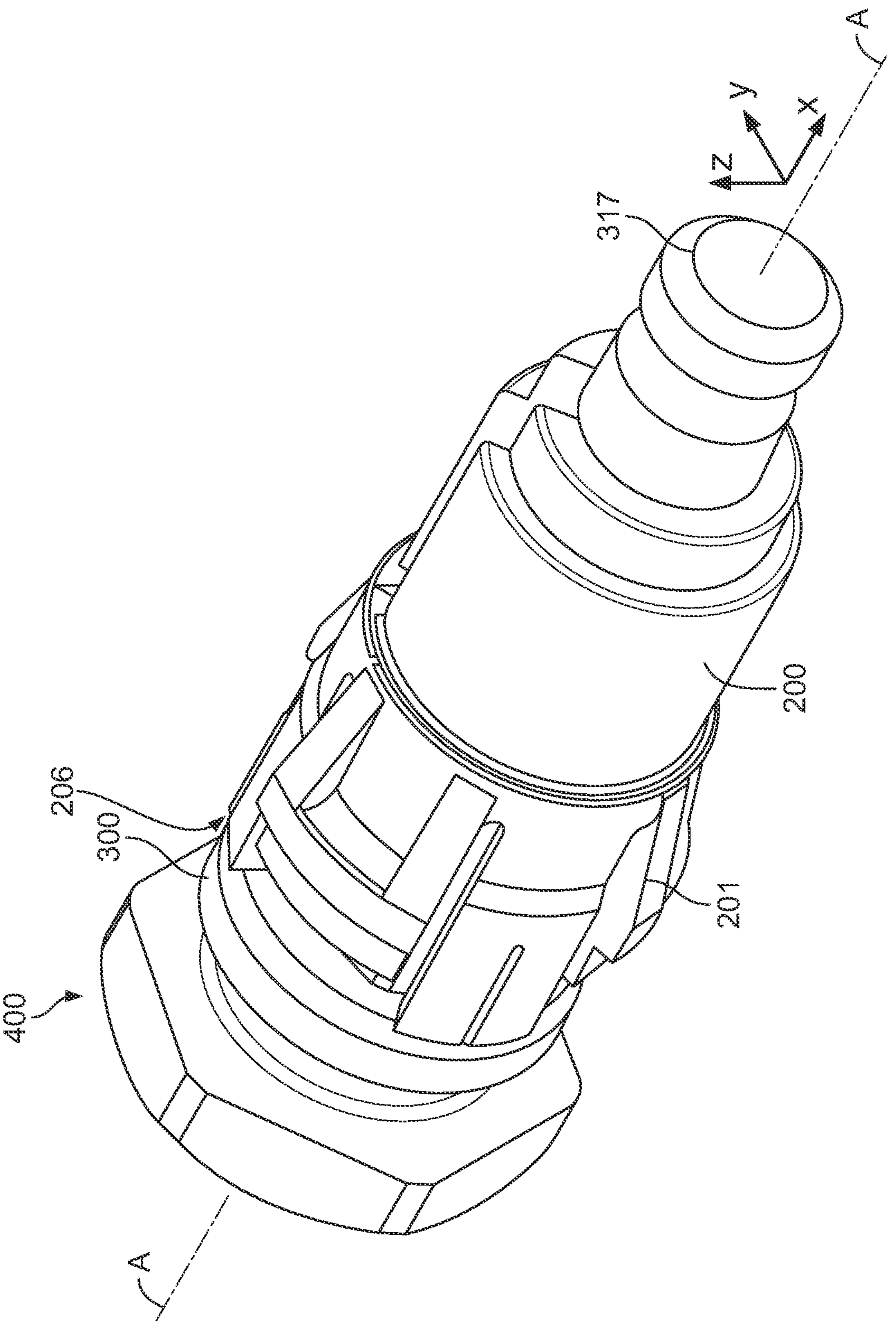
FIG. 7A displays a plug assembly according to a third embodiment of the invention, wherein a coding clip has been clipped on the plug of FIG. 6.

FIG. 7A displays a plug assembly 400. The plug assembly 400 illustrates a coding clip 200 of FIG. 5A clipped on the plug 300 of FIG. 6 by slipping the clip 200 over the plug in a direction opposed to the mating direction x.

This is achieved by inserting the distal end 317 of the plug 300 in the opening 206 at one end of the clip 200 provided in the first portion 201. The plug assembly 400 presents as described above an advantageous alternative to a plug with pre-molded coding shape. The plug 300 is inserted until the jut 216 is lodged in dent 11 and establishes a form lock that blocks axial displacement. At the same time, the hexagonal first body part 307 is slid into the corresponding inner circumference of the clip 200 and establishes a form lock that blocks rotational displacement of the clip 200 around the plug 300. The form lock is realized by matching the three sides of a hexagonal shape of the inner circumference of the first portion with three corresponding sides of the hexagonal first body part 307 of the plug 300.

By thus form fitting the clip 200 on the plug 300, the fool proofing function is be deported, i.e. externalized, from the plug to the clip. In particular, the coding shape 219 of the clip can be quickly and easily installed on the plug 300, instead of being formed or molded on it. Thus, the coding shape 219 can be exchanged if the need arises or the application of the plug is changed, while keeping a same generic plug part without coding shape 219. This is in particular beneficial when the plug 300 needs to be of a more expensive material with high resistance to use degradation, for example steel, while the coding section and in particular, the coding shape 219 does not need to be of the same material. Thus, the cost of production of the plug with coding part can be significantly reduced while externalizing the increased costs of a needed number of different coding shapes 219 to the production of the coding clip 200, which can be produced cost-efficiently.

Figure 7B:
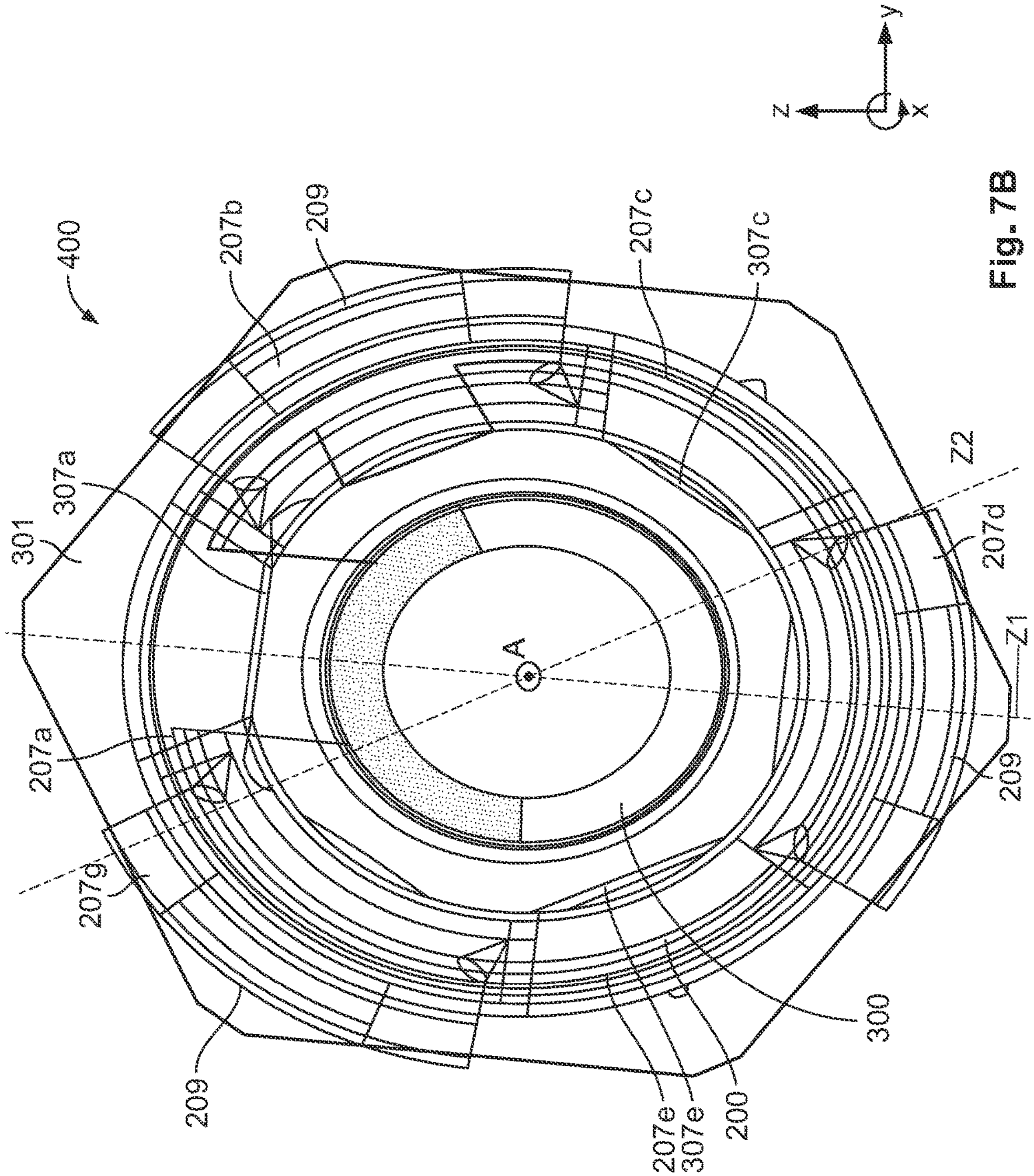
FIG. 7B displays the plug assembly of FIG. 7A in a radial view.

FIG. 7B displays a plane view of the plug assembly 400 looking against the mating direction x at the perpendicular plane y-z. FIG. 7B shows in particular the section axis Z1 of FIG. 5A previously described, and the section axis Z2 of FIG. 8, that will be described later.

The plug assembly 300 of FIG. 7B shows that the enlarged head 301 of the plug 300 has cross-section is larger than any other cross-section of the plug assembly 400. The clip 200 slipped over the plug 300 comprises the six sub-portions 207*a*, 207*b*, 207*c*, 207*d*, 207*e*, 207, which alternate clock-wise between short sub-portions 207*b*, 207*d*, 207*f* including protrusions 209, and thin sub-portions 207*a*, 207*c*, 207*e*.

As the clip 200 is slipped over the plug, the three thin sub-portions 207*a*, 207*c*, 207*e* are matched to three surfaces 307*a*, 307*c*, 307*e* of the hexagonal first body part 307 of the plug 300. The three matching engagements of sub-portions 207*a*, 207*c*, 207*e* with respective surfaces 307*a*, 307*c*, 307*e* establish the form fit between clip 200 and plug 300 which blocks any rotational movement of the clip 200 around the plug 300.

Figure 8:
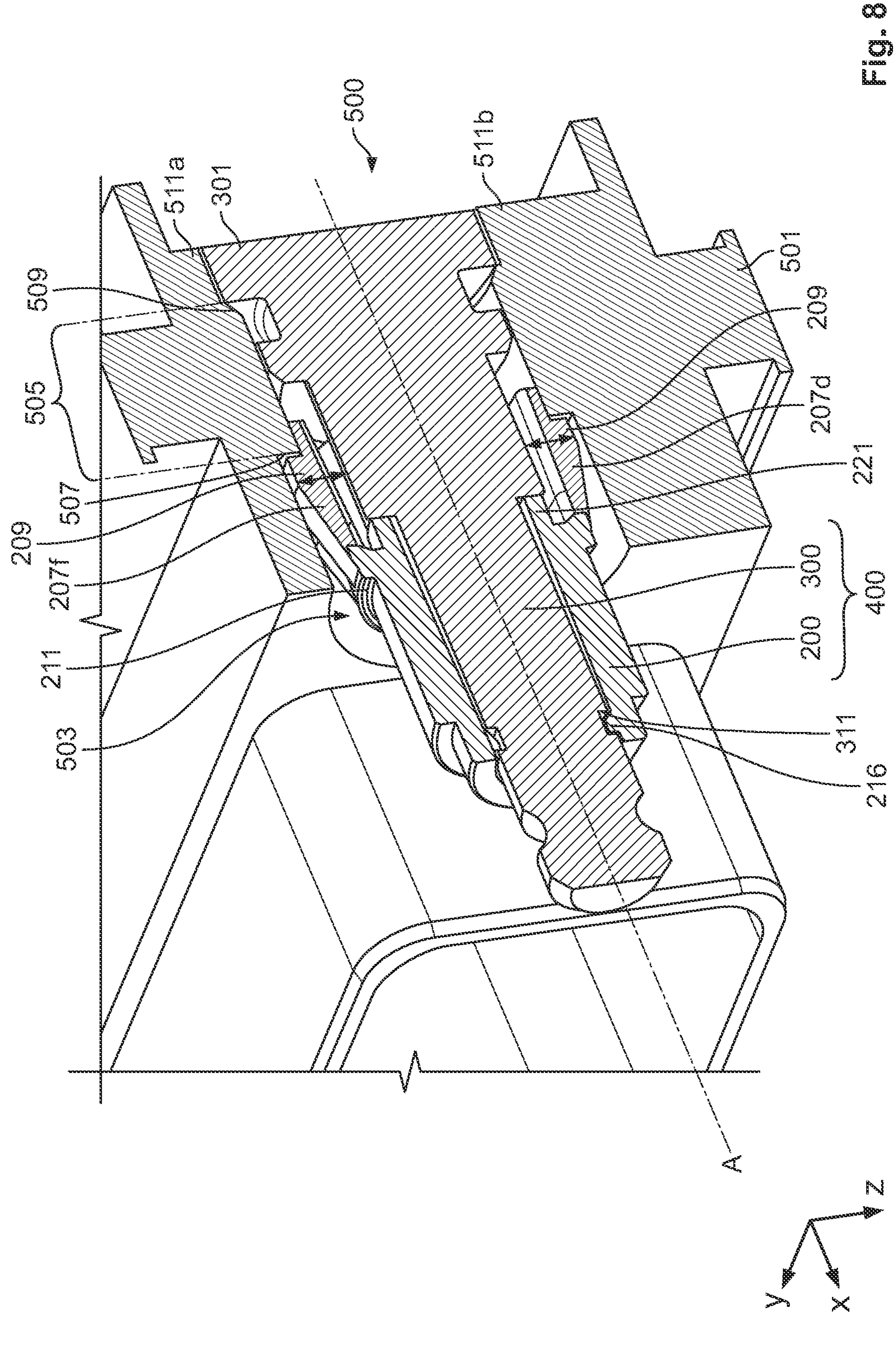
FIG. 8 displays a cross-sectional view of the plug assembly of FIG. 7A locked with a connector.

FIG. 8 displays a cross-sectional view along the mating axis A of the connector system 500, in which the plug assembly 400 has been introduced through an opening 503 of a connector 501. The connector 501 can be the mating connector 101 of the first embodiment. The opening 503 comprises a narrowed part 505 comprised between a first rim 507 and a second rim 509 in the opening 503.

The head 301 of the plug 300 is blocked from rotating around the mating axis A by a rigid blocking bars 511*a*, 511*b* at the second rim 509 at the opening 503 of the connector 501.

During the insertion through the narrowed part 505, the three sub-portions 207*b*, 207*f* are elastically displaced inwardly by the walls of the narrowed part 505 as illustrated by the double arrow. Once passed the first rim 507, the sub-portions 207*b*, 207*f* extend back outwards due to their elastic properties. In this case, a unidirectional form fit by the protrusions 209 is established and the plug assembly 400 cannot be pulled backwards again against the mating direction x.

Furthermore, the enlarged hexagonal head 301 of the plug 300 is blocked by the narrower second rim 509, thus the plug assembly 400 cannot move further inside the opening 503 of the connector 501. The plug assembly 400 is blocked inside the connector 501 using the clip 200 and the enlarged head 301.

A manual displacement of the sub-portions 207*b*, 207*f* can narrow the cross-section of the assembly 400 again and allow its removal of the assembly 400 through the narrowed opening 505, if needed.

According to the second inventive aspect, the coding clip 200 allows the plug 300 to be locked to the connector 501 without any time-intensive locking means, such as screwing, or irreversible locking means, such as welding. Instead, it suffices to push the assembly 400 through the opening 503 until the protrusions 209 establish the form fit with the first rim 507 and the head 301 abuts against the second rim 509.

The enlarged head 301 of the central plug 300 is furthermore positioned in a depression, as illustrated in FIG. 1B. Cross-sections of the two parallel walls 511*a*, 511*b*, which form the depression and extend parallelly to the direction y orthogonal to the mating direction x, are visible on FIG. 8. As already explained above, the two walls prevent a rotation of plug 300 around its axis. At the same time, the plug 300 can be positioned in six different orientations within the opening 503, thereby providing six further coding possibilities which can be combined for example with the six clips 200*a-f* as illustrated in FIG. 5A.

Furthermore, the jut 216 of the clip 200 is positioned in the dent 311 of the plug 300 and maintains the form fit of the clip 200 on the plug 300 in axial direction. Further stability is provided by an abutment of an internal protrusion 221 of the clip 200 extending from the intermediate portion 211 against the mating direction and abutting on the rim 319 of the plug 300.

Thus, the assembly of the plug 300 with the first connector 500 using the clip 200 can be quicker and less intrusive on the parts, while being reversible, quick and convenient in manual operation. This is a notable advantage over alternative known fool-proofing solutions and allows the plug assembly 400 to be changed and adapted on the fly. At the same time six times six different codings can be provided.

A connector 601 according to a third embodiment of the invention will be described with reference to FIGS. 9A, 9B and 9C.

Figure 9A:
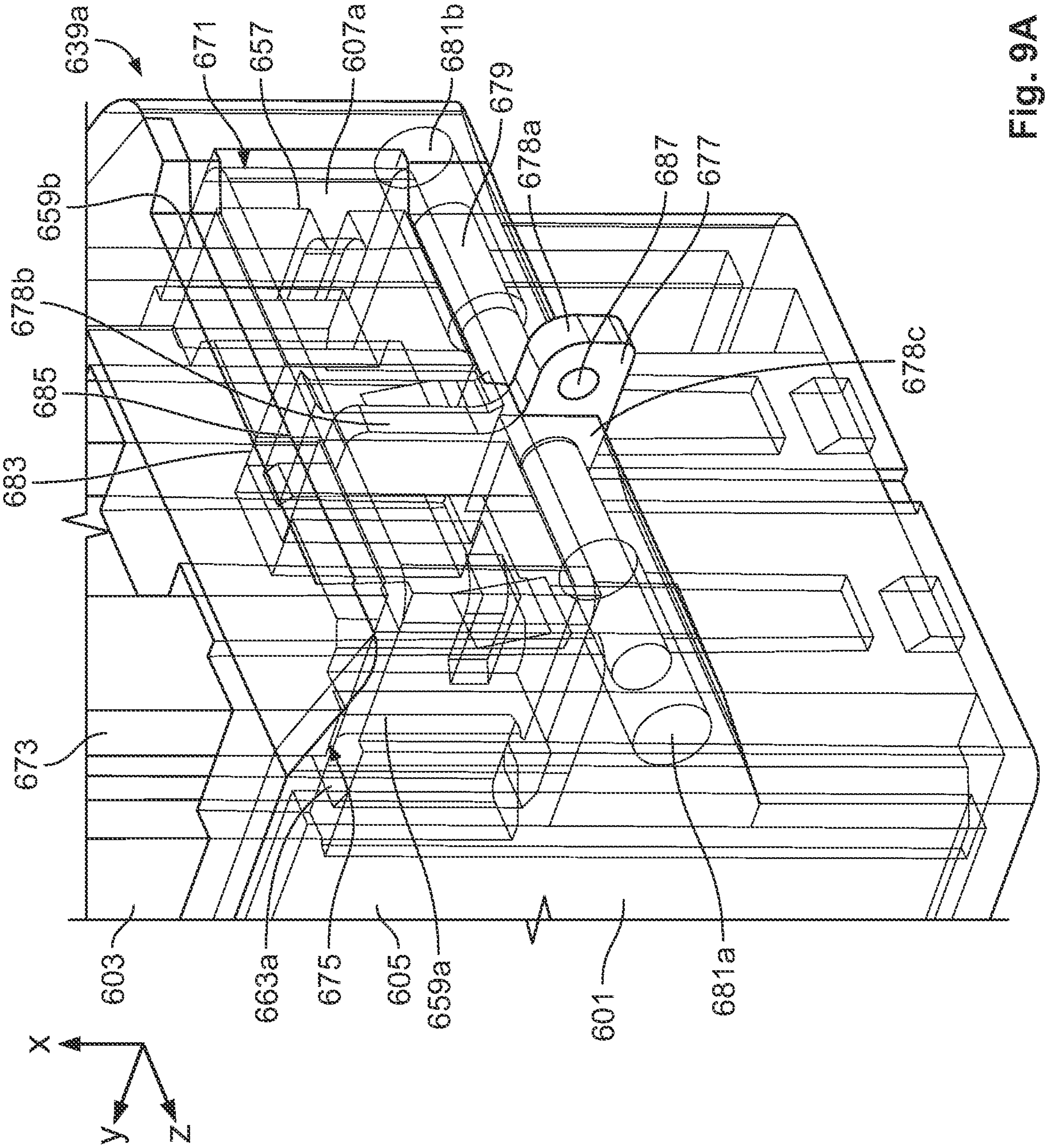
FIG. 9A displays a close-up view of the locking system of a connector according to a third embodiment of the invention, wherein the outer housing element of the connector is rendered transparent.

FIG. 9A displays a close-up view of the locking system of the connector 601 according to the third embodiment, wherein the outer housing element of the connector is rendered semi-transparent. The connector 601 differs from the connector 1 of the first embodiment, described with reference to FIGS. 1A to 4B, only with respect to the unlocking of the locking system. Thus, only the locking system is shown in FIG. 9A and will be described in detail. All the other features of the connector 601 of the third embodiment correspond to the features of the first embodiment. They will therefore not be described in detail again, and reference is made to their description above.

The connector 601 thus has an inner housing element 603 and an outer housing element 605. The outer housing element 605 ensheaths the inner housing element 603. A locker element 607*a* is moveably arranged in a dedicated locker space 671 in the outer housing element 605.

Compared to the first embodiment, the locker element 607*a* of the third embodiment in addition comprises an unlocking means 677 and a tilt shaft 679. The tilt shaft 679 is a cylindrical shaft rotatably disposed in a tilt shaft mounting 681*a*, 681*b* provided in the outer housing element 605 and extending in a direction z perpendicular to the plane x-y.

The unlocking means 677 can be metallic or plastic. The unlocking means is an L-shaped, monolithic component with a first arm 678*a*, a second arm 678*b* and an arm intersection region 678*c* between the two arms of the L-shape of the component. The first arm 678*a* can be shorter than the second arm 678*b*.

The locker element 607*a* comprises the actuation body 657, the lateral arms 659*a*, 659*b* and the hooks 663*a* and the spring elements of the first embodiment. The spring elements are hidden by the actuation body 657 and the hook of arm 659*b* is hidden by the inner housing element 603. In addition the locker element 607*a* comprises a body middle arm 683 extending orthogonally from the actuation body 657 in a direction y orthogonal to the mating direction x. The body middle arm 683 comprises an internal space 685.

In the view of FIG. 9A, the connector 601 is in a locked position. In this position, the outer housing element 605 has reached the end of is movement range with respect to the inner housing element 603 in a direction opposed to the mating direction x. The hook has 663*a* been activated by a spring force to slide in the notch 675 on the ridge 673 of the inner housing element 603, as explained with respect to the first embodiment. Thus, a positive form lock of the outer housing element 605 has been established with the inner housing element 603 locking the connector 601 in place. An attaching means 687 in the unlocking means 677 can receive a lanyard (not shown), or a pulling cord or wire. As will be explained with reference to FIGS. 9B and 9C, the lanyard attached to the attaching means can unlock a locked connector 601.

Figure 9C:
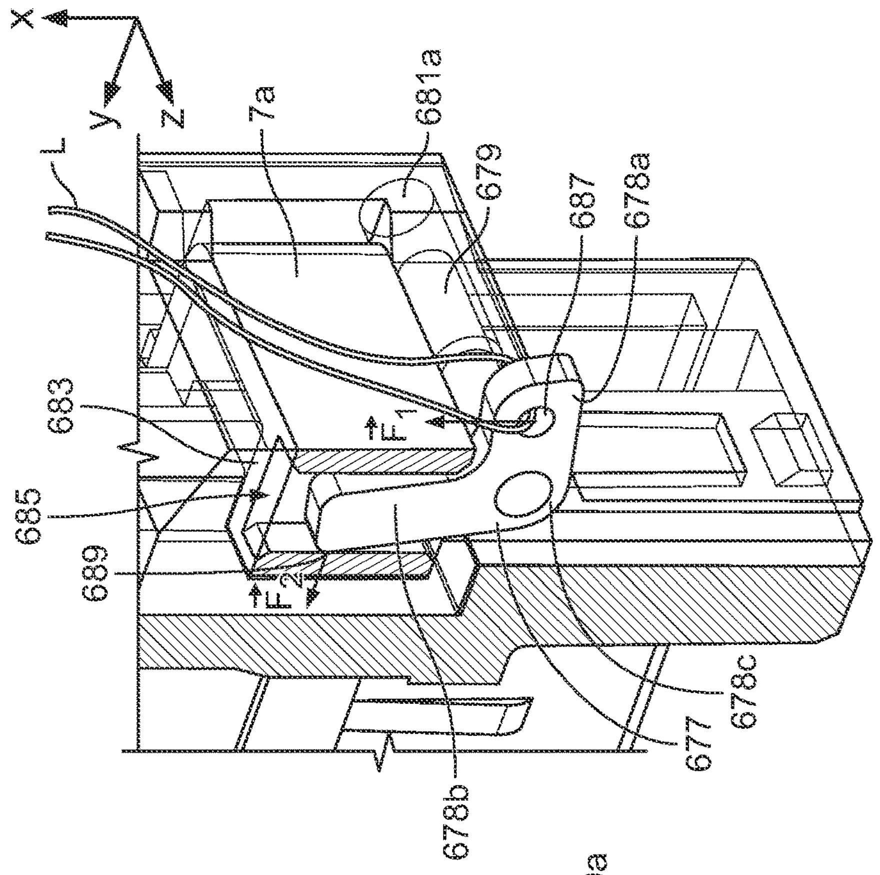
FIG. 9C displays the partially sectioned view of the locking system of FIG. 9A, in a mated but unlocked position.
Figure 9B:
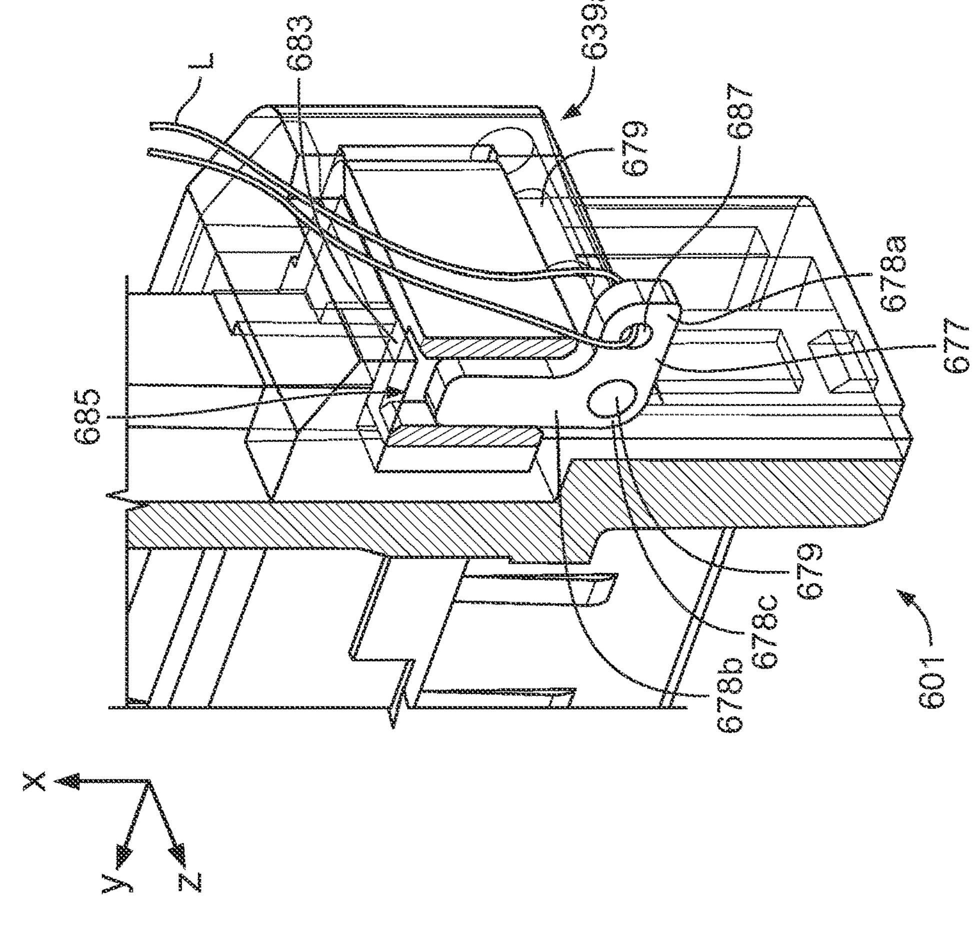
FIG. 9B displays a partially sectioned view of the locking system of FIG. 9A, in a mated locked position.

FIG. 9B displays a cross-section of the locking system of FIG. 9A. This view shows that tilt shaft 679 is rigidly attached to the arm intersection region 678*c* of the unlocking means 677. The second arm 678*b* is received in the internal space 685 of the body middle arm 683. The first arm 678*a* of the arm 683 protrudes from a short side surface 639*a* of the connector 601. At the distal end of the first arm 678*a*, the unlocking means 677 comprises the attaching means 687. The attaching means 687 can be a through hole traversing in a direction z orthogonal to the mating direction x the width of the L-shaped unlocking means 677. For illustrative purposes, a lanyard L has been drawn attached to the attaching means 687, here to be pulled through a through hole.

In the view of FIG. 9B, no force is exerted on the lanyard L attached to the attaching means 687. Thus, the unlocking means 677 and the attached tilt shaft 679 are in a rest position, wherein the second arm 678*b* extends parallel to the mating direction x.

FIG. 9C shows the same cross-sectional view FIG. 9A, wherein the unlocking means 677 has been activated by pulling of the lanyard L at least partially along the mating direction x.

In FIG. 9C, the lanyard L attached through attaching means 687 has exerted a force F1 at least partially in mating direction x on the first arm 678*a* of the unlocking means 677. Thus, the force F1 is at least partially transferred to the arm intersection region 678*c* and the attached tilt shaft 679. This tilt shaft 679 is rotatably disposed in the tilt shaft mounting 681*a*, 681*b* (681 not visible) and facilitates the conversion of the force F1 in a pivot motion of the L-shaped unlocking means 677. The unlocking means 677 thus pivots inside the arm internal space 685 of the body middle arm 683 around the axis of the tilt shaft 679, which is parallel to the direction z orthogonal to the mating direction x. The pivoting L-shaped unlocking means 677 encounters at point of contact 689 an inner surface of the body middle arm 683. Thus, it exerts a force F2 on the locker element 7*a*, which can counteract the spring force, for example from a spring element as described in the first embodiment, and dislodge the hook 663*a* from the notch 675 (not visible on 9C, see 9A), thus releasing the positive form fit lock.

The attachment of the lanyard to the unlocking means 677 of the locker element 607*a* enables a remote unlocking of the connector 601. This can be particularly meaningful in industrial applications with limited space, for example in tight airplane environments, or in large-scale electrical installations, in which a large number of similar connectors are mounted on top or adjacently of each other. In both cases, manual reach to a specific connector can be severely inhibited or at least impractical. In such a scenario, the ability to unlock and unmate connectors remotely can prove to be a notable advantage.

Figure 10:
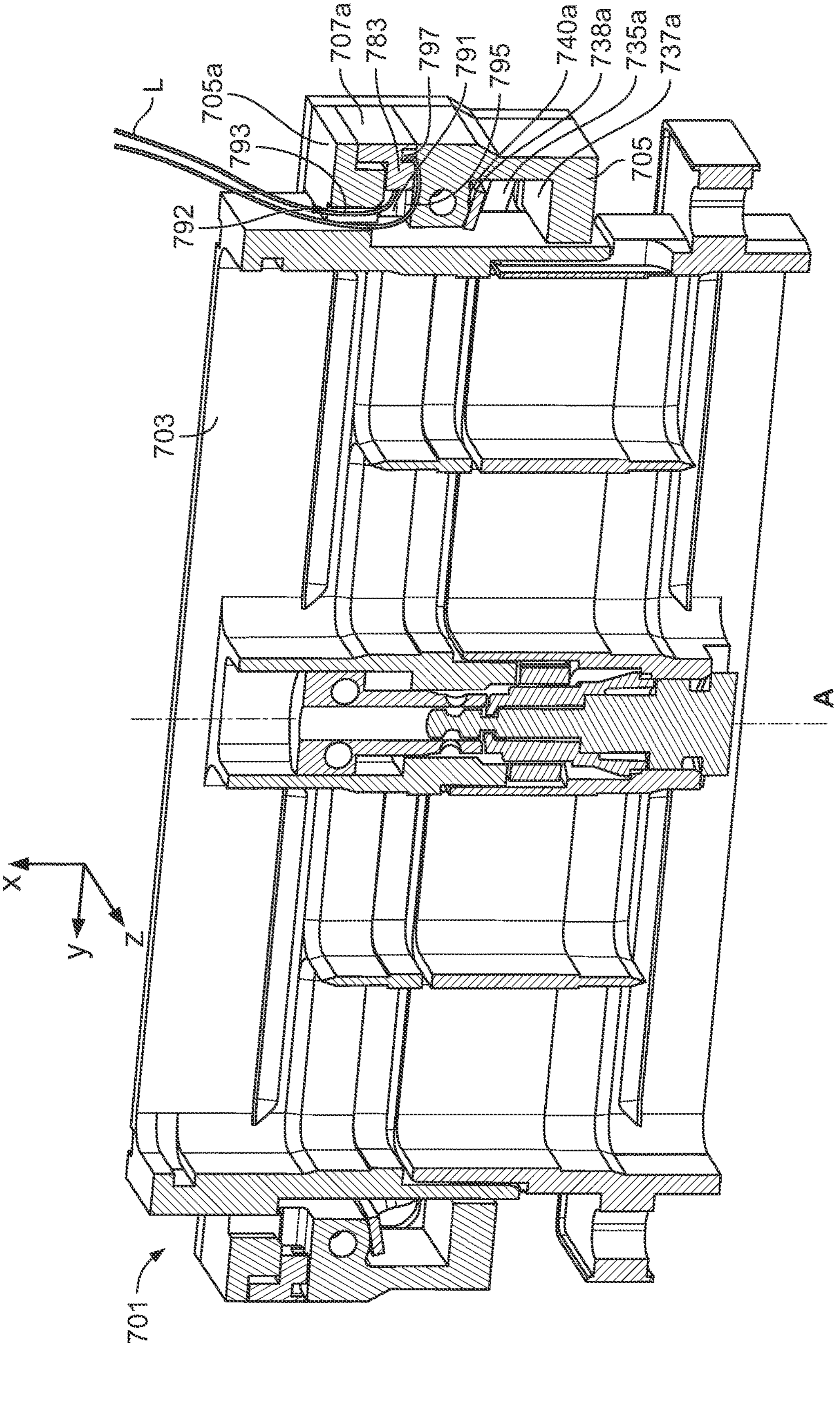
FIG. 10 displays a longitudinal cross-section of a connector according to a fourth embodiment of the invention.

A connector according to a fourth embodiment of the invention is described with reference to FIG. 10. The connector 701 constitutes in particular an alternative to the connector 601 of the third embodiment, in which remote unlocking using a lanyard is facilitated.

The connector 701 differs from the connector 1 of the first embodiment only with respect to the locking system. For example, blade 738*a* of the blade spring 735*a* abuts against interior surfaces 740*a* of the blade spring space 737*a* in the outer housing element 5, as is also the case in the first embodiment described. All the other features of the connector 701 of the fourth embodiment also correspond to the features of the first embodiment. Therefore, they will not be described in detail again and reference is made to their description above. Only the differing features will be described in the following.

In this fourth embodiment, a locker element 707*a* establishes a positive form lock in a manner identical to the one described with respect to the first embodiment. Namely, when the connector 701 is in a mated position and the outer housing element 705 has reached the end of its movement range in a direction opposed to the mating direction x relative to the inner housing element 703, hooks are slid into notches by a spring force.

In this embodiment, a guiding space 791 is provided inside the outer housing element 705. An opening 792 to the guiding space 791 is provided on the surface 705*a* of the outer housing element 705 facing the mating direction x, i.e. the surface opposite to the side of connection with a mating connector. This this embodiment, the opening is provided on the surface 705*a* at the interface with the inner housing element 703 ensheathed by the outer housing element 705.

The opening 792 provides an inlet for a lanyard L to a first portion 793 of the guiding space 795. The first portion 793 of the guiding space 795 extends along the mating axis A from the opening 793 on the surface 705*a* to an intersection with a second portion 795 of the guiding space 791. The second portion 795 extends transversally to the mating axis A into the outer housing element 705.

The locker element 707*a* comprises a body middle part 783, which is fit at least partially into the second portion 795 of the guiding space 791. The body middle part 783 can be further moved into the second portion 795 when the locker element 707*a* moves perpendicularly to the mating direction x, for example when the connector 701 is manually unlocked by actuating the locking element 707*a*.

The body middle part 783 comprises a U- or V-shaped pulling hole 797, with both ends of the arms of the U- or V shaped hole opening towards the second portion 795 of the guiding space 791.

Thus, the guiding space 791 guides a lanyard L inserted in the opening 792, through the first portion 793 and the second portion 795 in the pulling hole 797 around the body middle part 793 of the locker element 707*a*.

Thus, a traction on the lanyard L is translated by the first portion 793 in a force in mating direction x, which is then transferred by the second portion 795 in a force in the direction y orthogonal to the mating direction x. The force is directed by the pulling hole 797 reaching around the body middle part 783 onto the locker element 707*a*, which allows to counteract the spring force, for example from a spring element as described in the first embodiment, to disengage the hooks to thereby release the positive form lock.

On one hand, this allows for the direction of the traction force exerted by a pulling of the lanyard L to be efficiently oriented to the direction opposed to a spring force, for example from a spring element as described in the first embodiment. On the other hand, this allows for the path of the lanyard L to be more conveniently oriented directly to a surface 705*a* surface opposite to the side of connection with a mating connector. Thus, the risk of interference with or damage from the environment or other connectors is reduced. Finally, compared to the third embodiment, the space necessary for releasing the lock is reduced.

The invention is not limited to the embodiments described in this section, which serve as mere exemplary implementations of the invention. Individual features of the described embodiments or of various aspects of the invention can be combined amongst each other without departing from the scope of invention.

A connector according to a fifth embodiment of the invention is described with reference to FIGS. 11A, 11B and 11C. The connector 801 constitutes a particular alternative to connector 1 of the first embodiment, in which the lever system interacts with the locking system, as will be explained in the following. Only the differing features of connector 801 with respect to connector 1 will be described in detail. All the other features of the connector 801 correspond to the features of the first embodiment. Therefore, they will not be described in detail again and reference is made to their description above.

Figure 11A:
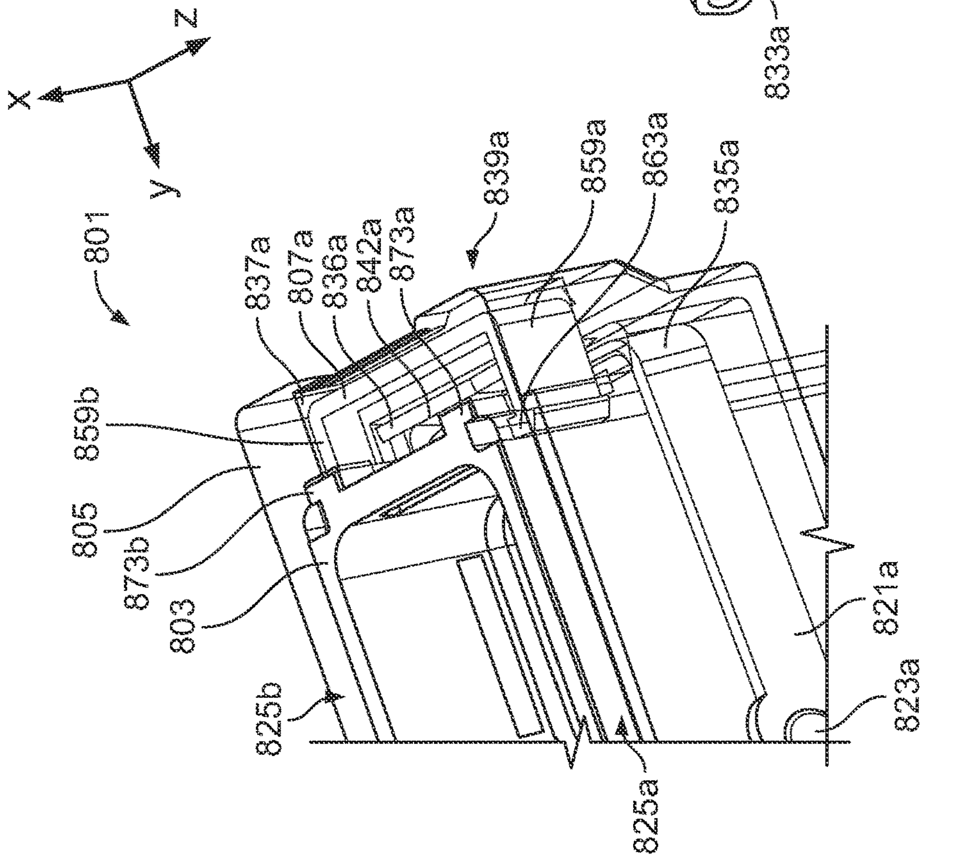
FIG. 11A displays a side view of a connector according to a fifth embodiment of the invention, in an unassembled and unmated position.

FIG. 11A shows view of one side of the connector 801 in an unmated, unassembled position. The invisible side can be assumed to be exactly symmetrical to the visible side with respect to the x-z plane. The connector 801 comprises an inner housing element 803, an outer housing element 805, and a locker element 807*a* disposed in a large housing space 837*a* in the outer housing element 805. The locker element 807*a* comprises, as known from previous embodiments, lateral arms 859*a*, 859*b*. The lateral arms 859*a*, 859*b* include hooks 863*a* at their respective distal extremities that can slide along respective ridges 873*a*, 873*b* in the inner housing element 803 during a mating sequence.

A lever beam 821*a* is pivotally mounted on a respective hinge 823*a* formed on a first side 825*a* of the inner housing element 803. The hinge 823*a* represents a fixed fulcrum point for the lever beam 821*a*. Three further lever beams, not visible on FIG. 11A, are arranged similarly on the inner housing element 803, as previously described in relation to the first embodiment.

Connector 801 differs from the connectors previously described by the crossbeam element 835*a*, which connects the two parallel lever beams 821*a* on the first side 825*a* and 821*c* (not visible) on a second side 825*b*. The crossbeam element 835*a* rigidly connects the lever beam 821*a* with the lever beam 821*c* (not visible) on the second side 825*b* of the inner housing element 803. The crossbeam element 835*a* extends along a short side 839*a* of the connector 801, in the large housing space 837*a* in the outer housing element 805.

As will described with reference to FIG. 11B, the crossbeam element 835*a* includes a latch element 836*a*, whose head portion 842*a* can be seen on FIG. 11A to be lodged between the lateral arms 859*a*, 859*b*. In the unmated position presented in FIG. 11A, the latch element 836*a* and its head portion 842*a* are not engaged with the locker element 807*a*.

The structure of the crossbeam element 835*a* will now be described with reference to FIG. 11B.

Figure 11B:
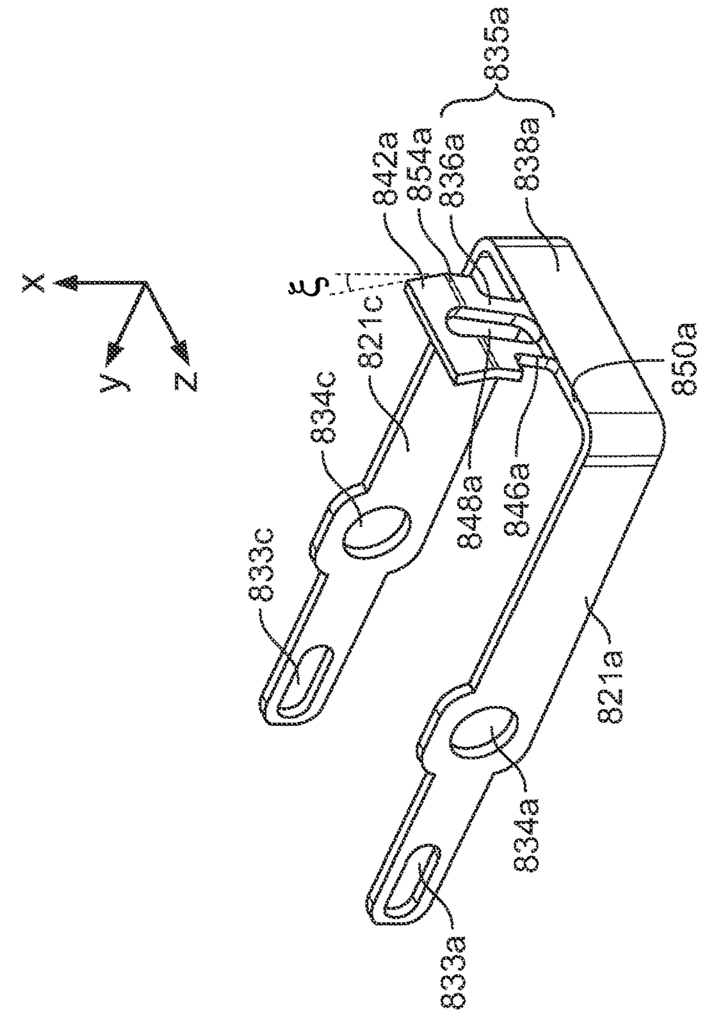
FIG. 11B displays a crossbeam element connecting two lever beams of the connector of FIG. 11A.

As known from previous embodiments, FIG. 11B shows that the lever beams 821*a*, 821*c* include cam grooves 833*a*, 833*c*, for the sliding of pins of a coupling element during the mating sequence, and round holes 834*a*, 834*c*, for the mounting of the lever beams 821*a*, 821*c* on respective hinges 823*a* of the inner housing element 803.

The crossbeam element 835*a* comprises the latch element 836*a* and a connecting portion 838*a*. The connecting portion 838*a* is a flat, plane beam, linking rigidly the extremities of lever beams 821*a*, 821*b* that are opposed to the cam grooves 833*a*, 833*c*.

In this embodiment, lever beams 821*a*, 821*c*, and crossbeam element 835*a* are produced as a single monolithic body, for example in stainless steel.

The latch element 836*a* is a T-shaped tongue that protrudes from a first thin surface 850*a* of the connecting portion 838*a* in the mating direction x. The T-shaped latch element 836*a* comprises a head portion 842*a*, and a neck portion 846*a* that connects the head portion 842*a* to the connecting portion 838*a*. While the neck portion protrudes from the connecting portion in a direction parallel to the mating direction x, the head portion 842*a* extends in a direction z orthogonal to the mating direction x.

The latch element 836*a* further comprises an oblong hole 848*a*, which is oblong in the mating direction x and traverses the latch element in a direction y orthogonal to the mating direction x.

While the connecting portion 838*a* and the neck portion 846*a* have a plane, flat shape arranged parallelly to the plane x-z, the head portion 836*a* is flat but slightly bent, meaning bent having an acute bending angle ξ with respect the plane x-z of less than 30°, in particular between 15° and 25°. The bent angle ξ of the head portion 836*a* has a chamfer or rounding 854*a*. on both surfaces of the head portion 842*a*.

Figure 11C:
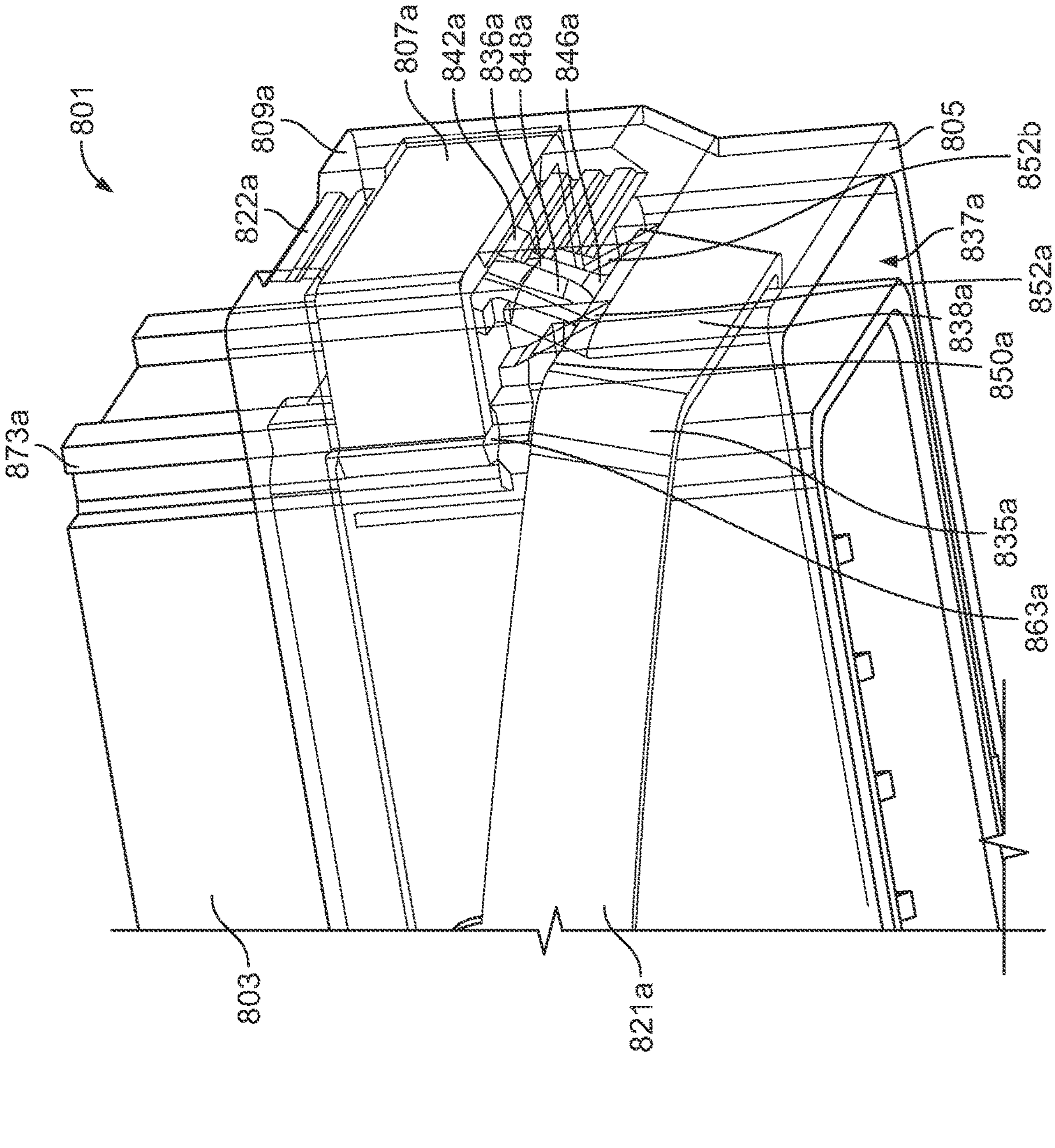
FIG. 11C displays a different view of the side of the connector of FIG. 11A, in a locked position.

The operation and function of this modified lever system will become clear in the study of the description of FIG. 11C.

FIG. 11C shows the connector 801 in a locked position. In this position, the outer housing element 805 has been moved relatively to the inner housing element in the direction opposed to the mating direction x. As known, for example from the first, third and fourth embodiment, the outer housing element 805 is pushed until the hook 863*a* of the locker element 807*a*, sliding along the ridge 873*a*, is lodged in a notch at the end of the ridge 873*a* in the inner housing element 803.

In this embodiment, the short lateral side 809*a* of the outer housing element 805 has a ribbed section 822*a*, which improves the manual grip on the outer housing element 805.

When the outer housing element 805 is pushed, in the unmated position, in the direction opposed to the mating direction x, two thin tangential interior surfaces 852*a*, 852*b* of the outer housing element 805, which protrude into the housing space 837*a* partially in a direction y orthogonal to the mating direction x, are engaged with the crossbeam element 835*a*. In particular, the two thin tangential interior surfaces 852*a*, 852*b* are engaged with the first thin surface 850*a* of the connecting portion 838*a* on either side of the protrusion of the neck portion 846*a* of the latch element 836*a*. Thus, as a pushing force is exerted on the outer housing element 805, the thin tangential interior surfaces 852*a*, 852*b* engaged with the first thin surface 850*a* exert a force on the crossbeam element 835*a*, such that the beam 82, as well as its three counterpart (not visible), pivot around the hinges (not visible). This activates the motion-reversing mechanism described in the first embodiment.

As the beams 821*a* rotate around their respective hinges, the crossbeam element 835*a* rotates with the beams 821*a*, rotating the head portion 842*a*. By virtue of the rotation of the head portion 842*a*, it moves at least partially in the direction opposed to the direction y, such that it engages with the locker element 807*a* inside the housing space 837*a*. Thus, as the outer housing element 805 is moved from an unmated to a mated position, a pressure is exerted by the head portion 842*a* on the locker element 807*a* in a direction opposed to the direction y, which is translated to a pressure of the hook 863*a* on the ridge 873*a* of the inner housing element 803.

When outer housing element 805 has reached the end of its traveling range, or the connector 801 has concluded the mating sequence to be in a mated position, the pressure exerted by the rotating head portion 842*a* causes the locker element 807*a* to be pushed such that the hook 863*a* is lodged in its notch in the ridge 873*a*.

Thus, when the outer housing element 805 reaches the end of its movement range with respect to the inner housing element, the outer housing element 805 is locked in a positive form lock with the inner housing element 803.

The bent angle of the head portion 842*a* provides a flat surface-on-surface engagement of the head portion 842*a* with the locker element 807*a* in two separate, rotated positions of the head portion 842*a*: the unmated position, wherein the outer housing element 805 is at the beginning of its traveling range with respect to the inner housing element 803, and the locked position, when the outer housing element is at the end the traveling range.

The chamfer or rounding 854*a* of the bent angle of the head portion 842*a* allows for the engagement with the locker element 807*a* be stable and rolling during the rotational movement of the head portion 842*a*.

The connector 801 can be unlocked as already previously described in relation to the first embodiment. As the locker element 807*a* is manually pressed in the direction y orthogonal to the mating direction x, the hook 863*a* can be displaced from its notch and the positive form lock released. As the locker element 807*a* is pressed, the latch element 836*a* is elastically bent with respect to the connecting portion 838*a*. The thinness and flatness of the neck portion 846*a* of the latch element 836*a*, as well as the further reduction of material density by the oblong hole 848*a* in the latch element 836*a*, improve the elastic properties and reduce the force necessary to release the form lock. The fifth embodiment described hereinabove advantageously combines the lever system and the locking system known from the first embodiment, which reduces the amount and complexity of distinct parts needed. For example, instead of having several specifically designed spaces in the outer housing element 805, for example dedicated locker element spaces 71 and blade spring spaces 37*a*, 37*b*, only one generic large housing space 837*a* can be implemented. Reducing the number and complexity of parts needed reduces the costs of production and maintenance, and increases reliability of the device, for example the mean-time-between-failure value.

Additionally, the locker system of the fifth embodiment does not require pre-loaded spring elements for the activation of the positive form lock of the locked position. Instead, the force and momentum realized to mate the connector 801 with a second connector is directly translated to a force that can move the locker element so as to activate the positive form lock. In particular, the force occurs only if a mating sequence is activated and not pressure is applied in the resting state. This reduces strain on the parts and further increases reliability.

In another advantage, the outer housing element 805 transfers force towards to the lever system at twice as many point of contacts, for example at two surfaces 852*a* 852*b* per side instead of just one surface, such as the blade 38*a* of the blade spring 35*a*. This positively contributes to an even distribution of force and momentum on the lever system during the mating movement.

What is claimed is:

1. A connector matable along a mating axis with a mating connector, comprising:

an inner housing element having a receptacle extending along the mating axis;

an outer housing element movable along the mating axis to the inner housing element from an unmated position of the outer housing element to a mated position of the outer housing element; and a coupling element with a hollow receiving and coupling with a plug of the mating connector in the hollow, the coupling element is arranged inside the receptacle of the inner housing element and is movable along the mating axis from an unmated position of the coupling element to a mated position of the coupling element, the coupling element is connected to the outer housing element by a motion-reversing mechanical system and movement of the outer housing element in one direction along the mating axis moves the coupling element in an opposite direction relative to the inner housing element.

2. The connector of claim 1, wherein the coupling element has a ball locking element coupling the coupling element with the plug of the mating second connector.

3. The connector of claim 2, wherein a ball of the ball locking element is received in a mating notch of the plug.

4. The connector of claim 2, wherein the receptacle of the inner housing element has a ledge activating the ball locking element to couple the coupling element with the plug.

5. The connector of claim 1, wherein the outer housing element ensheaths the inner housing element.

6. The connector of claim 1, wherein the motion-reversing mechanical system includes a lever system with a lever beam, an end portion of the lever beam is pivotally attached to the coupling element and another end portion of the lever beam is pivotally engaged with the outer housing element.

7. The connector of claim 6, wherein the lever system has four lever beams pivoting around four respective hinges formed on the inner housing element.

8. The connector of claim 7, wherein two lever beams are arranged on a first side of the connector and another two of the lever beams are arranged symmetrically on a second side of the connector opposite the first side.

9. The connector of claim 1, further comprising a locking system transitioning the connector from an unlocked position to a locked position, a relative movement along the mating axis of the outer housing element and the inner housing element is blocked by a positive form lock in the locked position.

10. The connector of claim 9, wherein the locking system has a locker element movably arranged in a direction perpendicular to the mating axis.

11. The connector of claim 10, wherein the locker element activates the positive form lock of the locked position with a notch formed on the inner housing element.

12. The connector of claim 8, wherein the lever system includes a crossbeam element connecting one of the lever beams on the first side of the connector with one of the lever beams on the second side of the connector.

13. The connector of claim 12, wherein the crossbeam element moves a locking system into a locked position when the outer housing element is moved into the mated position.

14. The connector of claim 13, wherein when the outer housing element is moved from the unmated position to the mated position, the crossbeam element engages with a locker element of the locking system such that the locker element is moved in a direction perpendicular to the mating axis and activates a positive form lock with the inner housing element.

15. The connector of claim 14, wherein a portion of the locker element protrudes from an external surface of the outer housing element when the connector is in a locked state.

16. The connector of claim 15, wherein the locker element has an unlocking device for releasing the positive form lock, the locking system has a lanyard attached to the unlocking device and pulling the lanyard unlocks the connector.

17. The connector of claim 16, wherein the outer housing element has a guiding space guiding the lanyard from an opening in the outer housing element to the unlocking device.

18. The connector of claim 17, wherein the guiding space changes a direction of the lanyard from a direction of the opening to a direction of a spring force, the opening is arranged on a side of the connector opposite the mating side.

19. The connector of claim 1, wherein the receptacle of the inner housing element has a fool proofing element mating with a corresponding mating fool proofing element on the plug, the fool proofing element is a coding ring form-fit on the inner housing element.

20. A connector system, comprising:

a connector including an inner housing element having a receptacle extending along a mating axis, an outer housing element movable along the mating axis to the inner housing element from an unmated position of the outer housing element to a mated position of the outer housing element, and a coupling element with a hollow, the coupling element is arranged inside the receptacle of the inner housing element and is movable along the mating axis from an unmated position of the coupling element to a mated position of the coupling element, the coupling element is connected to the outer housing element by a motion-reversing mechanical system and movement of the outer housing element in one direction along the mating axis moves the coupling element in an opposite direction relative to the inner housing element, the coupling element has a ball locking element; and a second connector matable with the connector along the mating axis, the second connector including a plug received in and coupled with the coupling element, the coupling element receives and couples with the plug in the hollow, a ball of the ball locking element is received in a mating notch of the plug.

* * * * *